United States Patent
He et al.

(10) Patent No.: US 12,515,079 B2
(45) Date of Patent: Jan. 6, 2026

(54) SYSTEMS AND METHODS FOR PERSONALIZED ULTRASOUND NEUROMODULATION

(71) Applicants: CARNEGIE MELLON UNIVERSITY, Pittsburgh, PA (US); Bin He, Pittsburgh, PA (US); Kai Yu, Pittsburgh, PA (US)

(72) Inventors: Bin He, Pittsburgh, PA (US); Kai Yu, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 18/553,901

(22) PCT Filed: Jun. 21, 2022

(86) PCT No.: PCT/US2022/034295
§ 371 (c)(1),
(2) Date: Oct. 4, 2023

(87) PCT Pub. No.: WO2023/278199
PCT Pub. Date: Jan. 5, 2023

(65) Prior Publication Data
US 2025/0073502 A1 Mar. 6, 2025

Related U.S. Application Data

(60) Provisional application No. 63/216,765, filed on Jun. 30, 2021.

(51) Int. Cl.
*A61N 7/00* (2006.01)
*G16H 20/40* (2018.01)

(52) U.S. Cl.
CPC ............... *A61N 7/00* (2013.01); *G16H 20/40* (2018.01); *A61N 2007/0026* (2013.01); *A61N 2007/0073* (2013.01); *A61N 2007/0078* (2013.01)

(58) Field of Classification Search
CPC .............. A61N 7/00; A61N 2007/0004; A61N 2007/0026; A61N 2007/0027;
(Continued)

(56) References Cited

U.S. PATENT DOCUMENTS

| 8,591,419 B2 | 11/2013 | Tyler |
| 2013/0079682 A1 | 3/2013 | Mischelevich |

(Continued)

FOREIGN PATENT DOCUMENTS

| CN | 104219996 A | 12/2014 |
| WO | 2020077275 A1 | 4/2020 |

OTHER PUBLICATIONS

Yu et al, "Electrophysiological source imaging of brain networks perturbed by low-intensity transcranial focused ultrasound," IEEE Transactions of Biomedical Engineering 63.9, 2016, pp. 1787-1794.
(Continued)

*Primary Examiner* — Boniface N Nganga
(74) *Attorney, Agent, or Firm* — KDW FIRM PLLC

(57) ABSTRACT

Disclosed herein is a system and method for implementing a personalized ultrasound neuromodulation system and methods with neural sensing of personalized electrophysiological data, guiding ultrasound targeting and dosage using such personalized data. Specific ultrasound transducer solutions are provided for various neural targets that enable the low-intensity focused ultrasound to modulate the central nervous system and peripheral nervous systems to treat a variety of neurological and mental disorders. A portable ultrasound console device, a wearable guiding apparatus and
(Continued)

a compact solution for effectively and safely enabling point-of-care neuromodulation, e.g., home healthcare, are provided. Further methods for ultrasound waveform customization are also described to improve effectiveness of ultrasound neuromodulation.

29 Claims, 32 Drawing Sheets

(58) Field of Classification Search
CPC .... A61N 2007/0047; A61N 2007/0073; A61N 2007/0078; A61N 2007/0095; A61B 8/46; A61B 8/469; A61B 8/0808; A61B 5/4058; A61B 5/4836; A61B 5/4848; G16H 20/40
USPC .............................................. 601/2
See application file for complete search history.

(56) References Cited

U.S. PATENT DOCUMENTS

| | | |
|---|---|---|
| 2013/0184728 A1 | 7/2013 | Mishelevich |
| 2014/0058292 A1 | 2/2014 | Alford |
| 2016/0143541 A1* | 5/2016 | He .................. A61B 5/374 |
| | | 600/407 |
| 2017/0080255 A1 | 3/2017 | Law |
| 2018/0140871 A1 | 5/2018 | Konofagou et al. |
| 2019/0308036 A1* | 10/2019 | Ebbini .............. B06B 1/0688 |

OTHER PUBLICATIONS

International Search Report and Written Opinion for Application No. PCT/US2022/034295 dated Nov. 15, 2022.
International Preliminary Report on Patentability for International Application No. PCT/US2022/034295, mailed May 14, 2024, 11 pages.

* cited by examiner

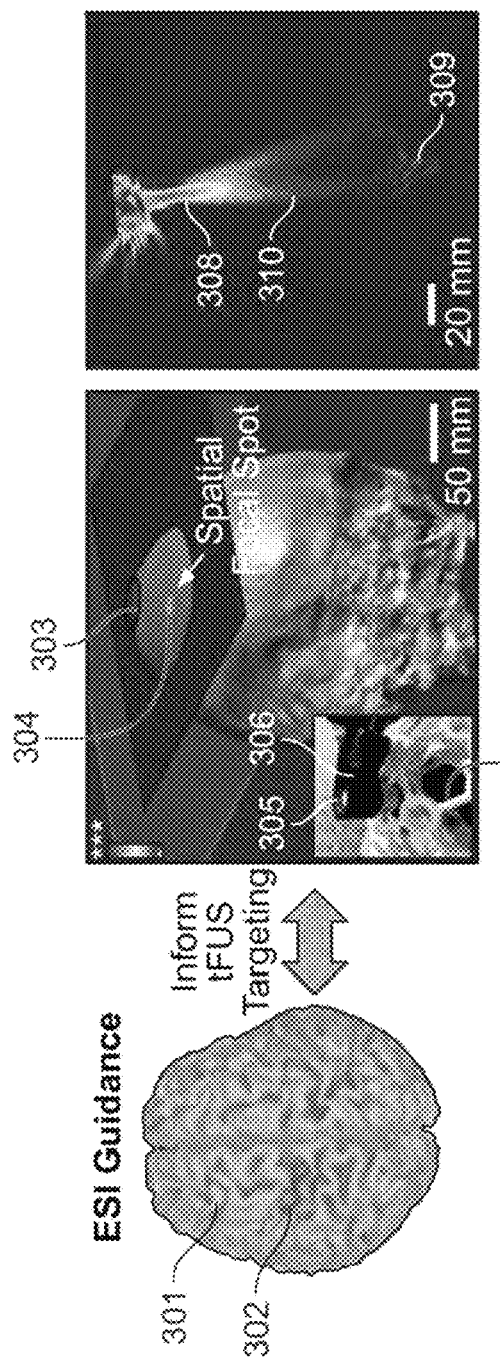
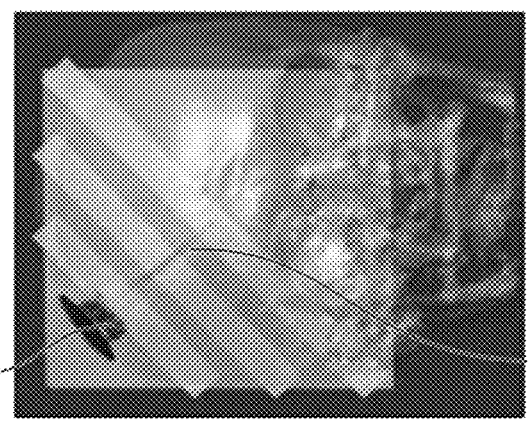
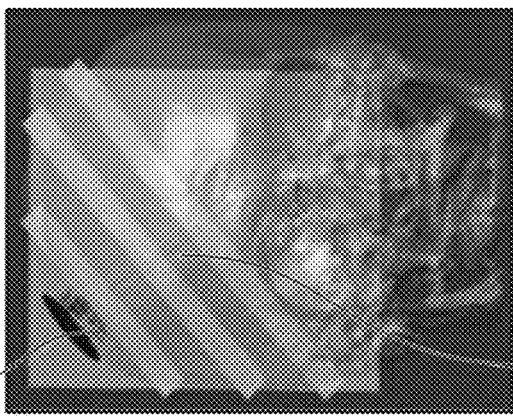
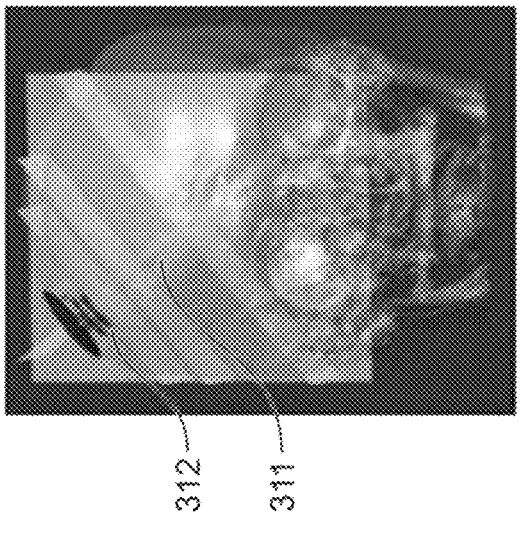
FIG. 3(a)
FIG. 3(b)

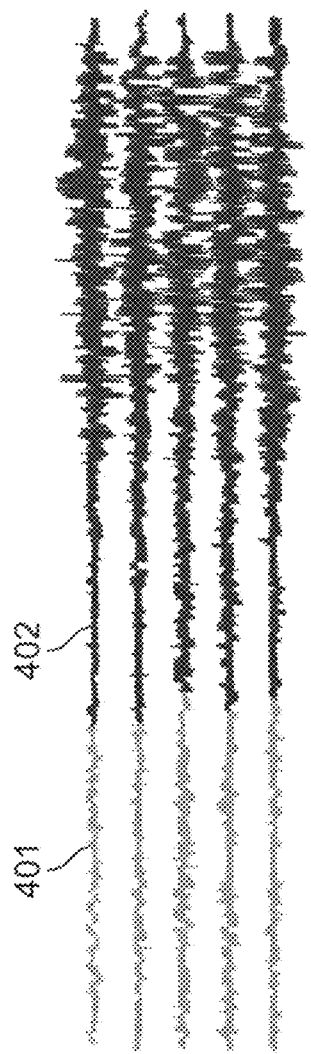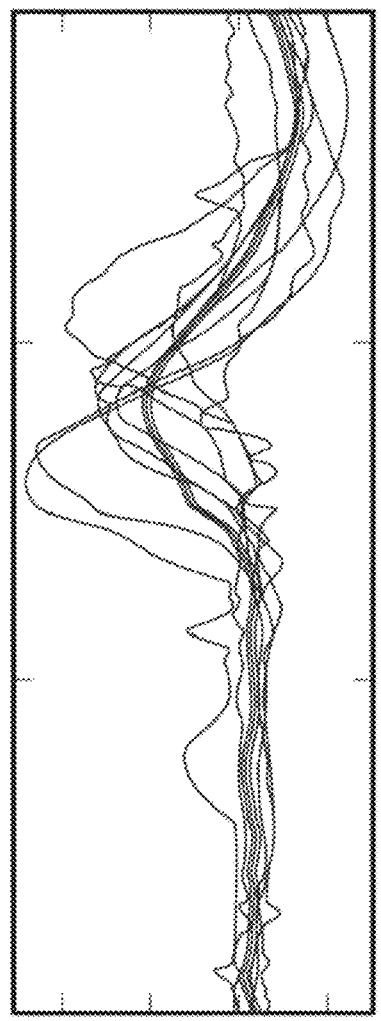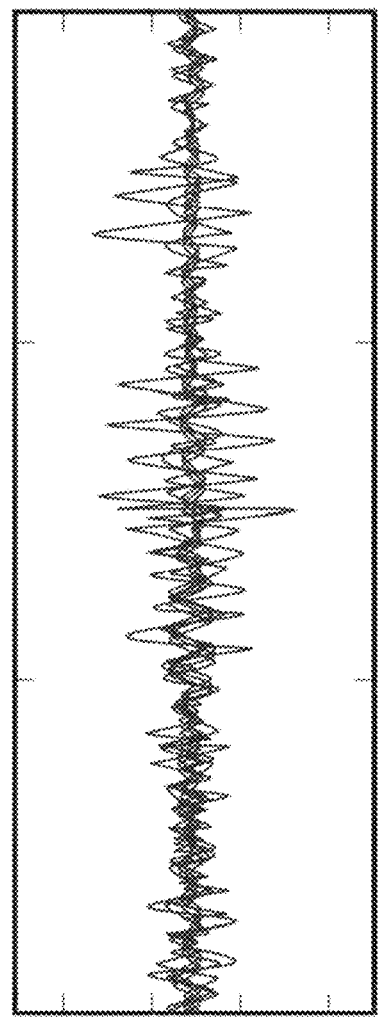

Axial View within Full Skull Cavity

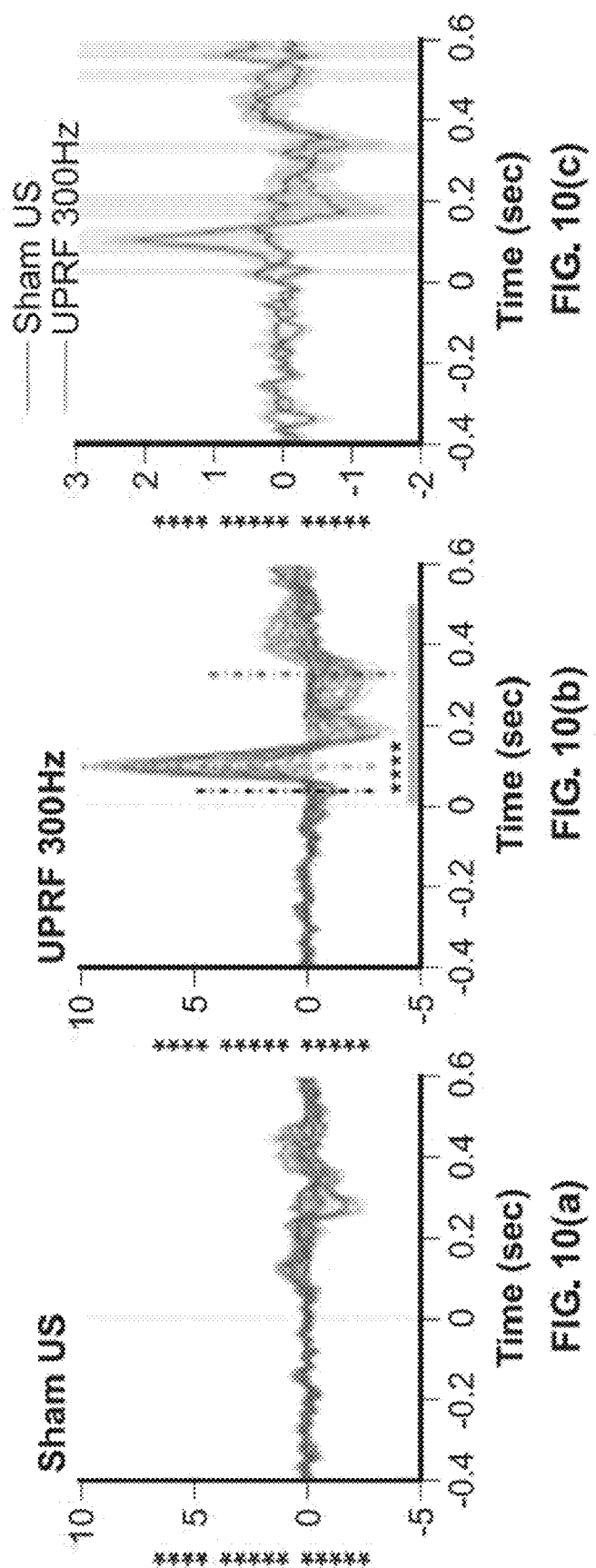

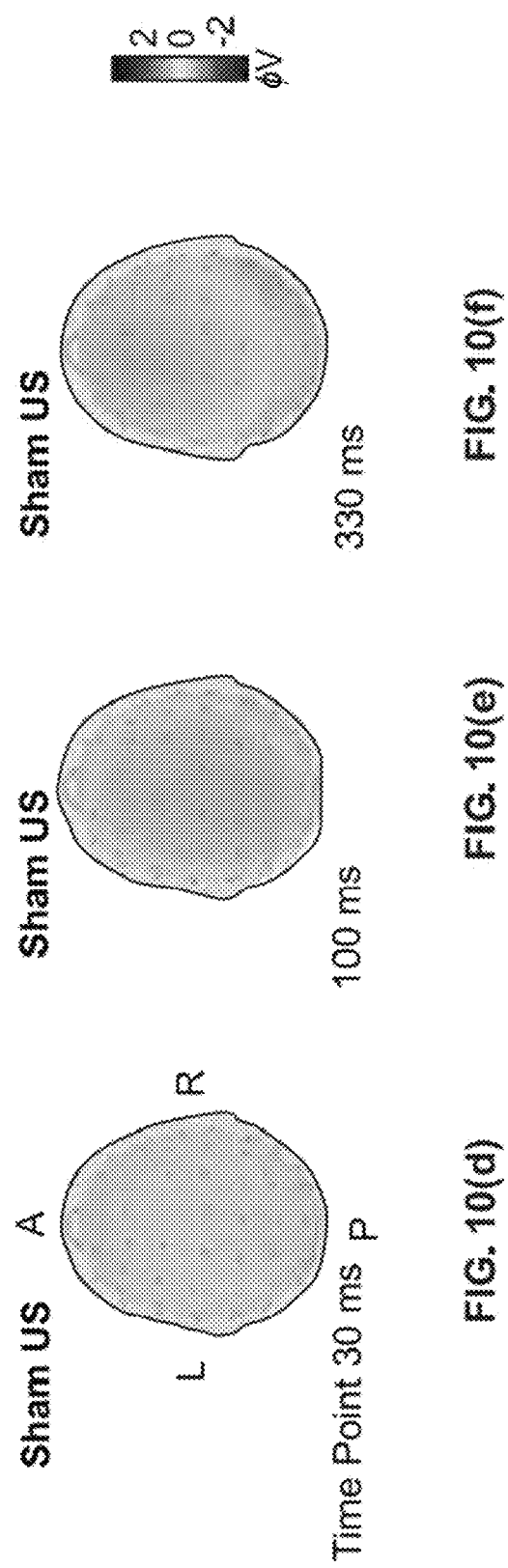

Sham US

Time Point: 100 ms

UPRF 300Hz 100 ms

Sham US 330 ms

UPRF 300Hz 330 ms

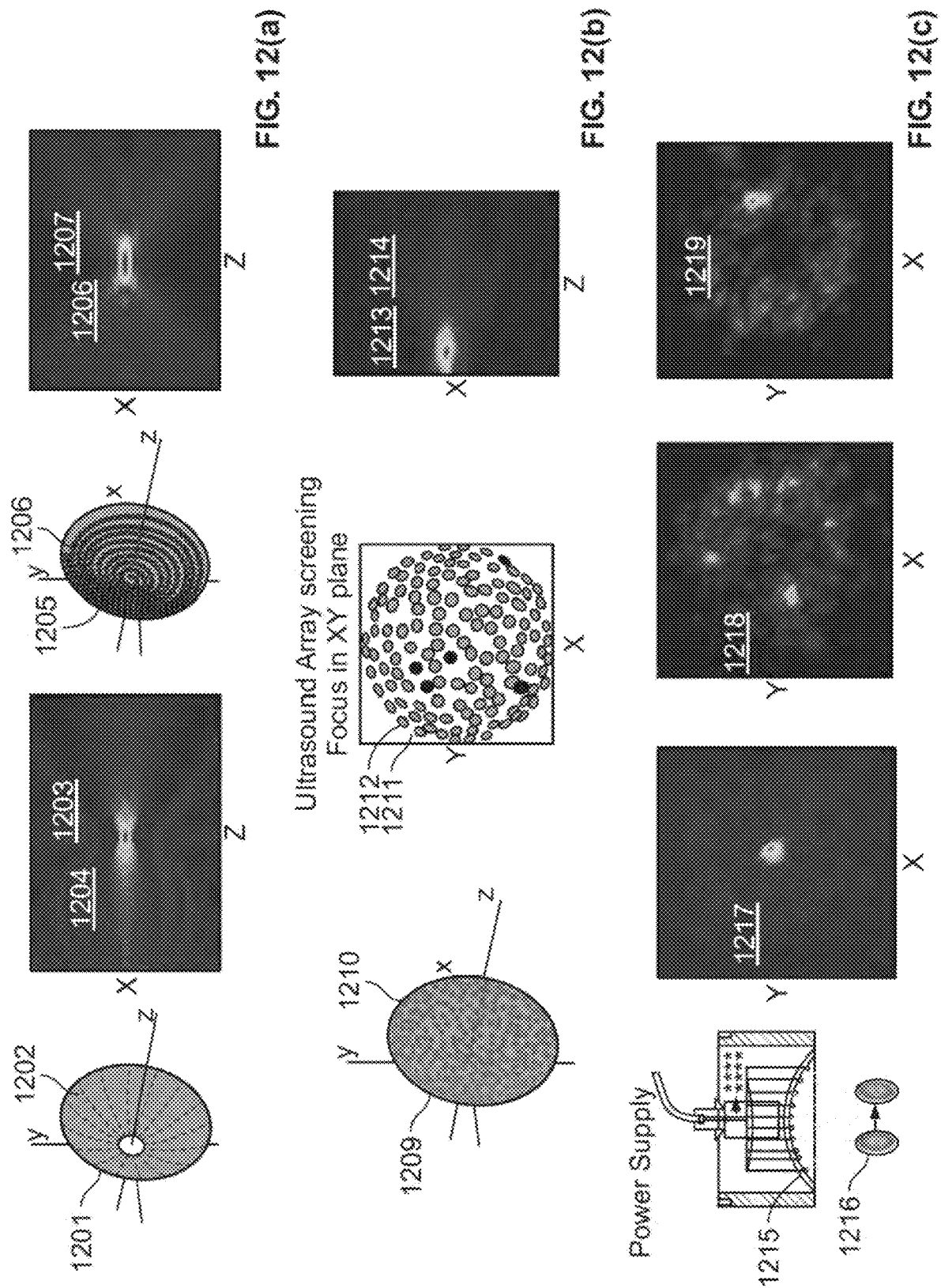

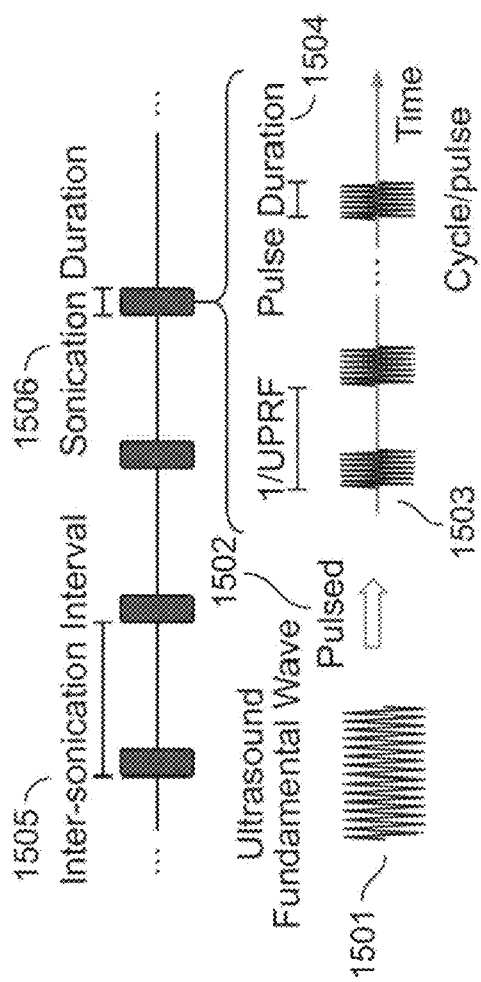
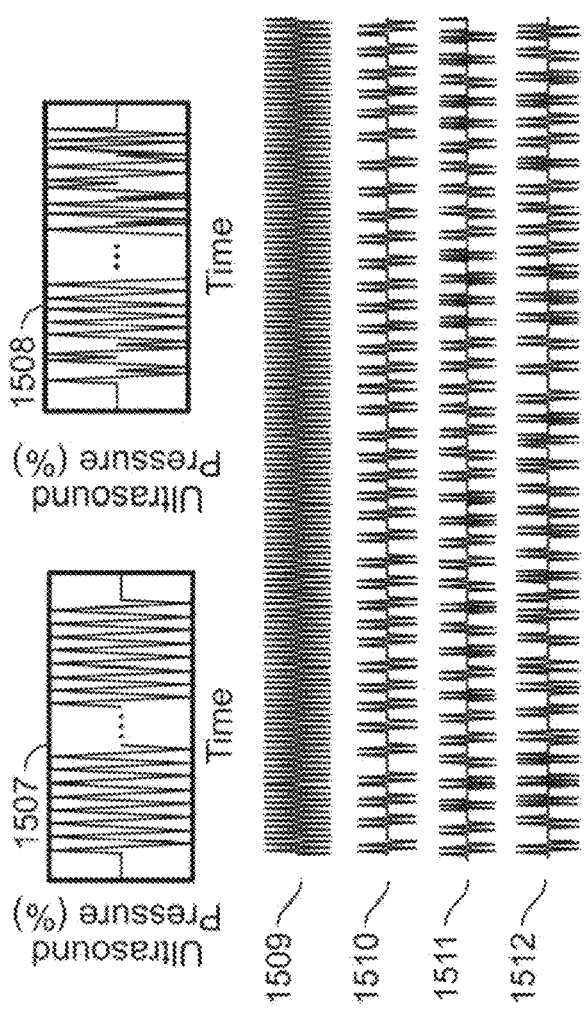
FIG. 15(a)
FIG. 15(b)

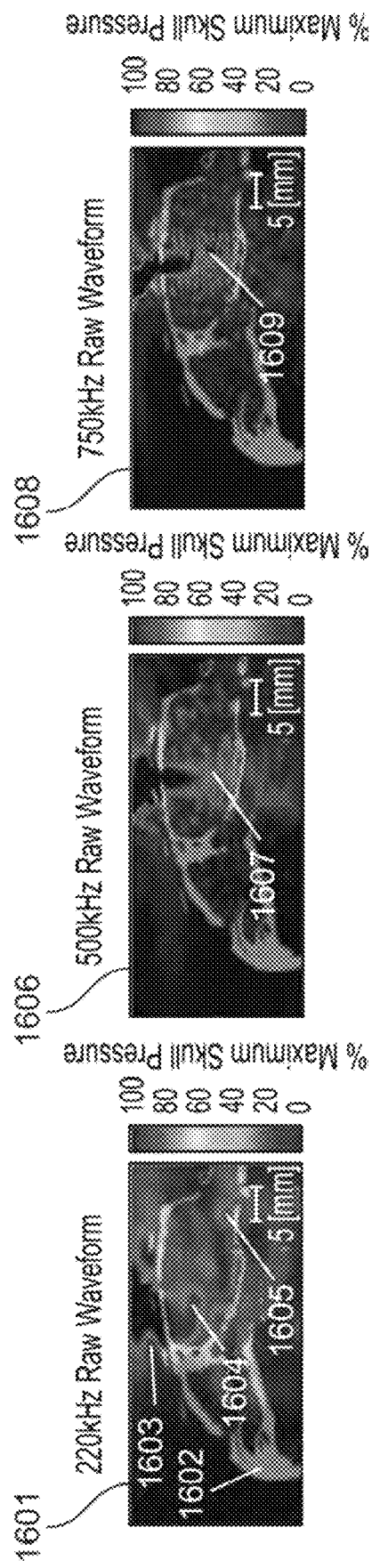
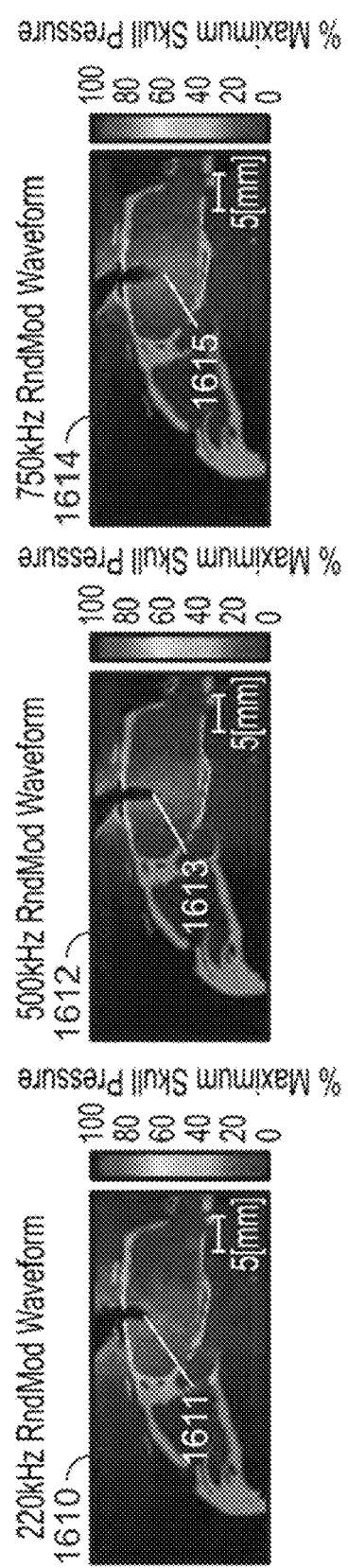
FIG. 16(a)
FIG. 16(b)

SYSTEMS AND METHODS FOR PERSONALIZED ULTRASOUND NEUROMODULATION

RELATED APPLICATIONS

This application is a national phase filing under 35 U.S.C. § 371 claiming the benefit of and priority to International Patent Application No. PCT/US2022/034295, filed Jun. 21, 2022, entitled "Systems and Methods for Personalized Ultrasound Neuromodulation", which claims the benefit of U.S. Provisional Patent Application No. 63/216,765, filed Jun. 30, 2021, the contents of which are incorporated herein by reference in their entireties.

GOVERNMENT INTEREST

This invention was made with U.S. government support under contracts NIH-EB029354 and MH114233 awarded by the National Institutes of Health. The U.S. government has certain rights in this invention.

BACKGROUND OF THE INVENTION

Neurological disorders are widespread throughout the world and afflict an enormous population for example, a billion people suffer from migraine, 264 million people suffer from depression and over 50 million epilepsy patients need effective treatments. The population of stroke patients in United States increases by more than 600,000 each year. Current treatment options default to pharmacological methods due to cost and ease of use. However, pharmacological agents can lead to serious side effects, such as drug addiction.

Neuromodulation is a technique to intervene with the central and peripheral nervous systems which has shown to be effective in managing various disorders including neurological and mental disorders. While patients fail to respond to pharmacological treatments, invasive neuromodulation techniques can be used, such as spinal cord stimulation, deep brain stimulation and motor cortex stimulation. Although invasive neuromodulation such as deep brain stimulation has shown its efficacy in treating diseases, it has limitations including risk of infections and complications, and high costs.

Non-invasive neuromodulation has been introduced to modulate brain activity treating neurological and mental disorders that do not have risks associated with brain implants and high costs. These include transcranial magnetic stimulation (TMS), transcranial direct current stimulation (tDCS) and transcranial alternating current stimulation (tACS). While these electromagnetics-based non-invasive neuromodulation techniques modulate brain activity and treat certain brain conditions, they are also limited because the electromagnetic energy used for the delivery of the therapy is diffused when entering into the scalp, due to volume conduction effect. As a result, TMS, tDCS and tACS do not have high spatial resolution or spatial focality in delivering its energy onto brain targets.

Low intensity transcranial focused ultrasound (tFUS) has recently emerged as a safe, non-invasive neuromodulation technique with high spatial resolution and focality with the capability to access the deep brain. During tFUS neuromodulation, pulsed mechanical energy is transmitted though the skull with high spatial selectivity. The pulsed mechanical energy can be steered and utilized to elicit activation or inhibition through parameter tuning. tFUS has been observed to induce behavioral changes (e.g., motor responses), electrophysiological responses, (e.g., electromyography, electroencephalography (EEG), local field potentials, and multi-unit activities) with high in-vivo temporal/spatial measurement fidelity, or neurovascular activities (e.g., blood-oxygenation-level-dependent (BOLD) signal). tFUS features high resolution targeting of deep brain regions, the ability to electrically target and steer the focal zone in real time and the ability to simultaneously target multiple brain regions.

Both diagnostic and therapeutic applications of tFUS require guidance for precise targeting and feedback evaluation. An optical-based image-guided brain navigator is commonly used to guide the transcranial energy onto desired brain regions for TMS and tFUS. The spatial navigating performance is mainly determined by an optical tracking camera in terms of 3D root mean square volumetric accuracy and repeatability. Neuro-navigation systems have been used to guide the ultrasound transducer placement over the head based on the brain's structural information. The strongest BOLD functional MRI (fMRI) signals in motor representations assist in the identification of tFUS targets, although to get such functional target information requires an additional session of functional task in fMRI. The optical-based image-guided brain navigation is mainly for planning the direction of ultrasound focus on the needed brain target, which is based on the relative positions of tFUS transducers and a subject's head.

The image-guided approach is not limited to the use of MRI, and computer tomography (CT) images can provide acoustic properties of the skull, thus serving the purpose for accurate refocusing through a time reversal process for a multielement ultrasound array. Furthermore, to acquire in vivo knowledge in regard of the transcranial focal location, MR-guided focused ultrasound has been developed especially for the application of brain surgery without opening the skull. Two approaches have been employed to measure the transcranial focus of ultrasound energy. The first method is by measuring temperature rise using magnetic resonance (MR) thermography. The second method is through quantifying tissue displacement using MR-based acoustic radiation force imaging. These two techniques can inform localization of the focal spot when relatively high intensity ultrasound is applied using MR-compatible ultrasound transducers, although the strong static magnetic field used in the MRI also affects the brain excitability. Further, the MR pulse sequences can also trigger human auditory responses. In addition, ultrasound imaging guided focused ultrasound neuromodulation was also explored. Furthermore, a recent functional ultrasound imaging technique has shown merits by taking advantage of improved ultrasound spatial resolution and superior ultrasound frame rate.

The functional ultrasound has the capability to image microvascular dynamics by virtue of high temporal resolution for monitoring responses from small brain models. However, functional ultrasound relies heavily on high frequency energy (e.g., 18.5 MHz) which has factually posed a challenge for a translational application onto large brain models, such as adult human brains.

Of importance is the development of neuromodulation techniques that can be personalized on an individual subject, and, in particular, based on sensing of personalized functional data of the subject that can be obtained in a natural setting. In the case of the brain, the brain functional status manifests information with regard to a particular brain region impacted by anatomy and structural connectivity, as well as neural activation and functional connectivity. The effect of neuromodulation, such as tFUS, varies depending on the locus of acoustic energy deposition and the alignment of such acoustic energy with relevant neural targets in space, as well as in phases relative to oscillatory or evoked brain activity. Such relationship reflects the nature of various brain activity as individualized by various brain regions and personalized in individual subjects and associated conditions. Furthermore, the effect of ultrasound neuromodulation can be optimized by adjusting and optimizing the ultrasound intensity based upon brain response to prior and ongoing ultrasound neuromodulation.

Similarly, peripheral neural stimulation, such as vagus nerve stimulation, has been shown to modulate various nervous systems and can treat a number of neurological and mental disorders. Occipital nerve stimulation and trigeminal nerve stimulation have also been shown to play a role in treating pain. It is desirable to optimize ultrasound configurations of peripheral nerve stimulation such as vagus nerve stimulation, occipital nerve stimulation, or trigeminal nerve stimulation, based on personalized functional data from the individual's nervous systems.

It has been shown that significant biomarkers can be detected from functional data through personalized neural sensing, such as electrophysiological signal detection and processing. Such functional data have shown important relevance and significance with the underlying physiological activities and pathological conditions related to a particular individual. For example, in epilepsy patients, interictal spikes, seizures, and even high frequency oscillations are demonstrated as biomarkers to quantify spatial and temporal relevance to epileptogenic tissue. Neuromodulation techniques that are guided by such personalized functional data can optimize its efficacy and efficiency when treating epileptic seizures. Similarly, personalized functional data using EEG has demonstrated its capability of quantifying pain. Neuromodulation techniques that are informed and optimized by such personalized functional data would provide effective and efficient treatment for patients suffering from pain, by adjusting the ultrasound neuromodulation dosage as informed from personalized functional data in a particular individual suffering from pain.

Personalized functional data can not only be detected and extracted from pathology in individuals, but also reflect mental status and well-being in individuals who do not have an observable medical condition. For example, personalized functional data have been observed in healthy human subjects who underwent mindful meditation training in comparison to subjects who did not have a sustained training experience.

Taking all into consideration, there is a need for personalized neuromodulation, in particular personalized ultrasound neuromodulation. Electrophysiological signals accompanying neuronal excitation reflects unique personalized functional data, that can be used, in addition to other personalized data, to guide, determine and optimize parameters of ultrasound neuromodulation in a closed-loop setting.

SUMMARY OF THE INVENTION

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein are methods and devices for personalized ultrasound neuromodulation that can be adjusted according to an individual's unique information including personalized functional and anatomic data, to identify stimulation target, identify and optimize stimulation parameters, for the purpose of modulating central and peripheral nervous systems using ultrasound energy.

The present invention provides personalized ultrasound neuromodulation to nerves based upon neural sensing of personalized data of an individual. Such personalized data includes electrophysiological, structural and individual specific information that are collected and used to guide low intensity transcranial focused ultrasound stimulation generated by specific ultrasound transducer solutions for central and peripheral nervous systems.

The present invention includes methods of determining various ultrasound transducer solutions and specific temporal ultrasound sequences for effectively delivering ultrasound energy to the nervous system.

The present invention includes the closed-loop framework of electrophysiologically guided focused ultrasound (ESgFUS), in which personalized electrophysiological data are detected from an individual and used to provide spatial guidance to the ultrasonic targeting and to inform the specific ultrasonic dosage onto the nerve targets and to further provide assessments regarding the neuromodulation effects at specific neural circuits.

The present invention includes compact, ergonomic and portable ultrasound neuromodulation apparatus and device enable the delivery of specific ultrasound energy through the transducer(s) in natural, point-of-care scenarios, e.g., home healthcare.

The present invention includes ultrasound stimulation methods for stimulating the central nervous system, as well as peripheral nervous systems such as vagus nerves, occipital nerves, trigeminal nerves, sacral nerves and tibial nerves to treat various conditions.

BRIEF DESCRIPTION OF THE DRAWINGS

In the drawings, like reference characters generally refer to the same parts throughout the different views. In the following description, various embodiments of the present invention are described with reference to the following drawings, in which:

FIGS. 3(a-b) show the electrophysiological source imaging guidance which informs the tFUS targeting onto motor cortex with the ultrasound focus and beam illustrated at multiple ultrasound fundamental frequencies and in multiple views.

FIGS. 12(a-c) show diagrams demonstrating specific ultrasound spatial profiles generated by different ultrasound array configurations to effectively enhance spatial targeting by suppressing side lobes, and to steer the ultrasound focus by random ultrasound array.

FIGS. 15(a-b) show ultrasound temporal sequences for neuromodulation and their further modifications to enhance the spatial targeting of tFUS.

FIGS. 16(a-b) show the tFUS beam improvement by randomizing the phase and fundamental frequency of ultrasound waveforms at three ultrasound fundamental frequencies.

DETAILED DESCRIPTION

The present invention is directed to systems and methods for ultrasound stimulation, with personalized neural sensing, of the central nervous system and peripheral nervous systems such as vagus nerves. The invention will be explained in the context of its application to brain stimulation using transcranial focused ultrasound with personalized neural sensing. Examples of personalized neural sensing in terms of EEG with or without neuromodulation, will be shown. While personalized neural sensing can be accomplished using electromagnetic recordings, including EEG or magnetoencephalography (MEG), for the simplicity of description, electrical sensing or EEG is referred to herein for purposes of obtaining personalized functional data. The invention disclosed herein addresses the concept and practice of guiding and optimizing ultrasound neuromodulation using collected personalized data from an individual.

Brain activation is accompanied by induced electrical activity due to excitation of neurons. The electrical activity of the brain can be analyzed on a variety of scales depending on the aim and focus, including the levels of ion channels, synapses, neurons, neuronal ensembles, lamina, columns, regions, and networks. Invasive electrophysiological recordings such as spike trains and local field potentials, as well as intracranial EEG, have contributed to the understanding of neuronal activities at microscopic or mesoscopic scales. Understanding of human brain dynamics at macroscopic scales, however, relies on non-invasive measurements such as EEG. EEG reports rich personalized functional information about brain function (or dysfunction) encoded by dynamics of large-scale brain networks. This makes EEG highly useful for detecting and extracting personalized functional data from an individual.

Electrophysiological Source Imaging (ESI) guided Ultrasound Neuromodulation—In one embodiment of the invention, ESI is employed to obtain personalized functional data about the physiology and pathology of the nervous systems, by which ultrasound stimulation target and ultrasound parameters are determined and optimized. ESI is the process of estimating neural electrical activity underlying non-invasive electrophysiological measurements such as EEG. The principle of ESI is to counter the effect of volume conduction or field propagation for reconstructing neural sources from electrophysiological measurements over a surface of a biological system.

Figure 1:
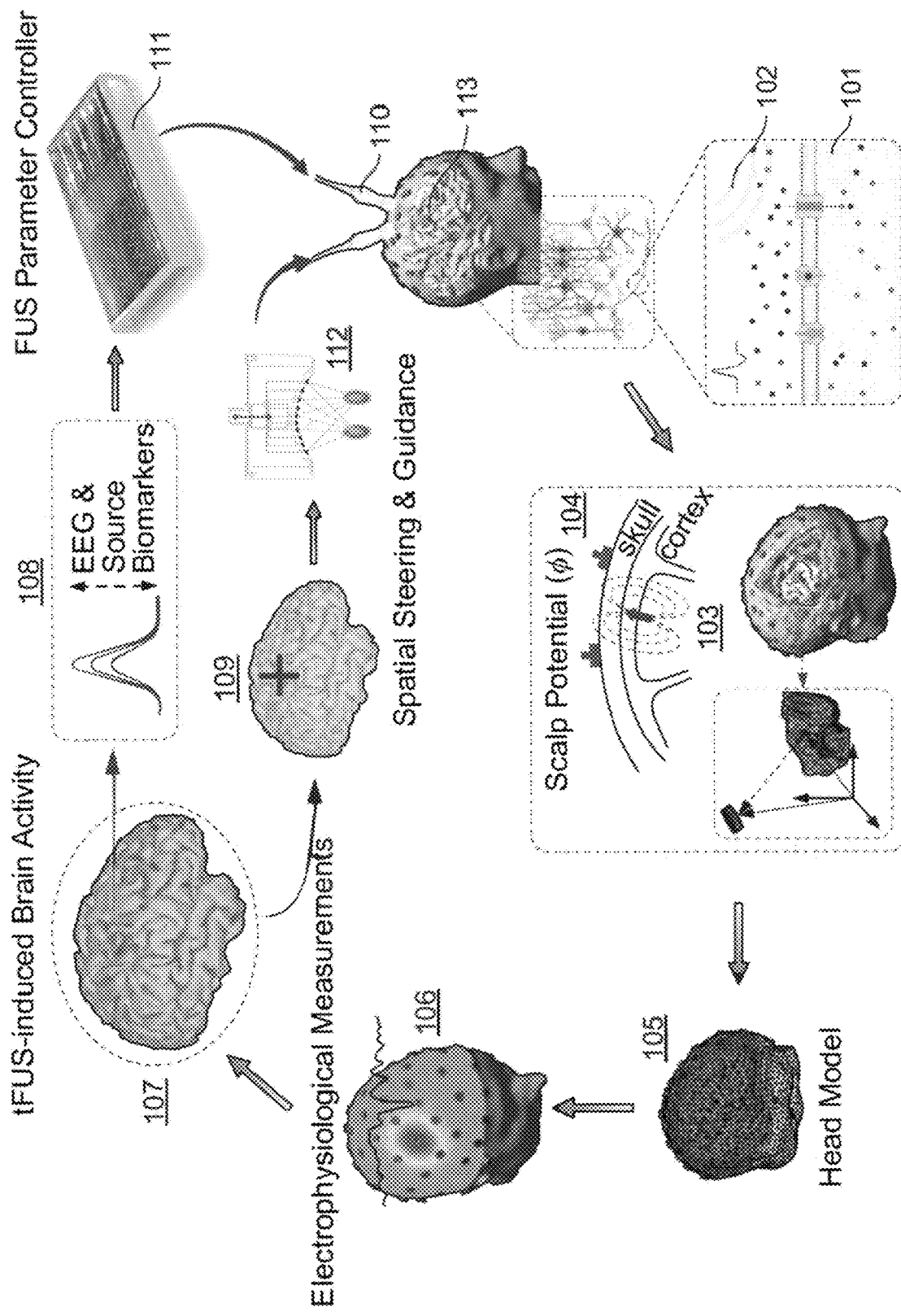
FIG. 1 shows the relationship of ultrasound stimulation, its induced brain activity, and the methods for sensing electrophysiological functional data and guiding personalized ultrasound neuromodulation.

With reference to FIG. 1, given an imbalance between the ions inside and outside a neuron, a change occurs in the potential difference between the cell interior and exterior 101. When this change exceeds a threshold, the cell produces a sharp deflection of the transmembrane potential, referred to as the action potential. These action potentials propagate through neuronal axons and travel from one physical point to another, allowing neurons to communicate over a variety of spatial scales. Such transmembrane potential or associated transmembrane ionic currents, is an intrinsic characteristic of excitable neurons, and can be influenced by external stimulation such as ultrasound stimulation 102.

Electrical currents 103 are produced by the movement of charges inside, outside, and along the neuronal cells. The electrical fields due to these microscopic currents, when added constructively, can produce observable electrical signals at the macroscopic level 104. The spatial distribution of such currents determines an overall effect on the body surface that is time dependent, leading to spatio-temporal distribution of electrophysiological signals using recording sensors on a surface of the body that can be sensed and used to derive personalized functional data about the state of nervous system and the effect of ultrasound stimulation. For EEG recording, the sensors are electrodes, while for MEG recording, the sensors are magnetic. Note that references to EEG herein are meant to include both EEG and MEG sensing and source imaging to obtain personalized functional data.

EEG signals primarily arise from post-synaptic currents. Given neuroelectric currents, finding the resulting electrophysiological signals on the scalp is referred to as solving the forward problem of EEG. The electric fields are generated by the currents that propagate through brain tissue and produce an effect at scalp sensors.

Anatomical constraint can be obtained from structural MRI for the head-brain, which offers soft-tissue contrast to segment the brain, skull, cerebrospinal fluid and scalp, to provide enhanced precision of ESI imaging. For realistic-geometry head models 105, numeric solutions are attainable with either the boundary element method (BEM) by assuming isotropic conductivity or the finite element method (FEM) models which can handle anisotropic conductivity of tissue. Solving the forward problem of the EEG provides a model-generated EEG over the scalp, that can be compared with experimentally measured EEG to estimate source distributions corresponding to the EEG measurements 106.

The current density distribution 107 of brain activity can be estimated from scalp EEG by means of signal processing algorithms—the so-called inverse problem. Usually, a current density distribution can be used to obtain source imaging results that are corresponding to a given EEG measurement over the scalp. Similarly, the current density distribution 107 of brain activity can also be estimated from scalp MEG recordings using portable magnetic sensors, such as magnetic sensors using optically-pumped magnetometers (OPMs).

The ESI can be formulated mathematically as an optimization problem. For this underdetermined optimization problem to be solvable, regularization terms or prior assumptions are necessary. Typically, assumptions about the spatial distribution or characteristics of underlying sources as well as their temporal dynamics need to be made. This naturally translates to solving optimization problems of the following form:

$$\underset{j}{\mathrm{argmin}} \|\phi - \mathcal{K}_j\|_p^p + \mathcal{R}_s(j) + \mathcal{R}_T(j) \quad (1)$$

where:
- ϕ is a matrix of electrophysiological signals, (EEG or electrical signals recorded using electrodes over a portion of the body surface or MEG or magnetic signals recorded using magnetic sensors over a portion of the body surface) over a certain time interval;
- $\mathcal{K}$ is the lead-field matrix which models how source current densities (i.e., j) are related to the body surface electrophysiological recordings (i.e., ϕ);
- $\mathcal{R}$ is a regularization term that captures spatial priors;
- $\mathcal{R}$ is a regularization term that expresses temporal priors; and
- p is any real number equal to or larger than 1 (p≥1) which is used to define the p-norm in Eq. (1), such that for vector x=($x_1$, $x_2$, . . . , $x_n$):

$$\|x\|_p = \left( \sum_{i=1}^n |x_i|^p \right)^{\frac{1}{p}} \quad (2)$$

FIG. 1 illustrates one embodiment of the invention, where the relationship of neuronal excitation, volume conduction, scalp EEG, and the estimated sources are shown, together with transcranial focused ultrasound (tFUS) stimulation.

The ultrasound parameters can be first determined from baseline EEG measurements. tFUS beam(s) 110 are targeted at brain regions of interest 109 using a single ultrasound transducer 110 or a plurality of ultrasound transducers 112. The resulting brain activity, in reference to baseline activity, is sensed as EEG signals which represent manifestation of altered transmembrane currents 113 flowing through the brain volume conductor. Through ESI imaging, tFUS induced brain activity 107 is obtained, such that tFUS targeting 109 can be adjusted to achieve precise targeting at neural circuits of interest. The ultrasound parameters including pulse repetition frequency and duty cycle, as well as intensity can be adjusted using a parameter controller 111 based on personalized information of EEG and source biomarkers 108.

Figure 2:
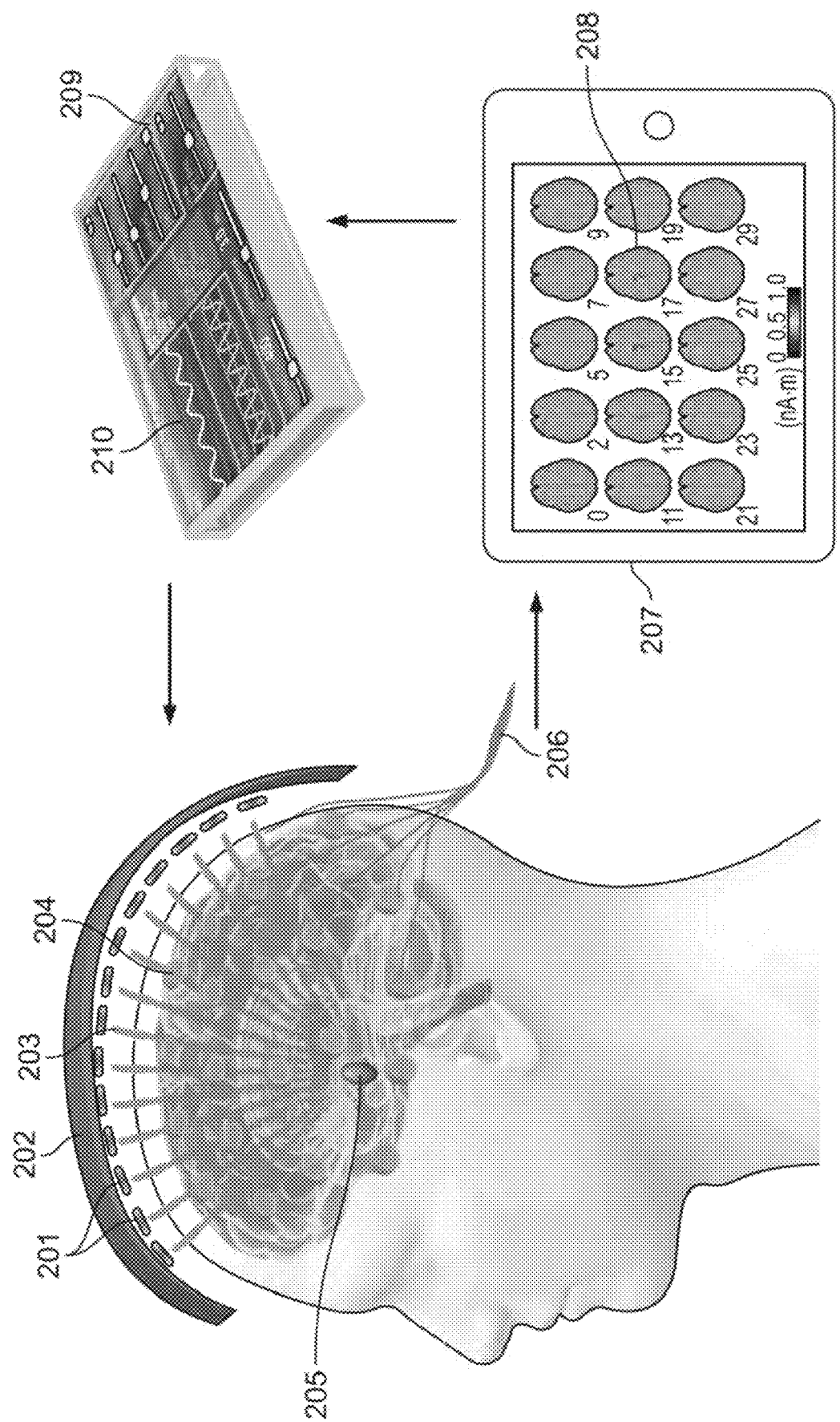
FIG. 2 shows a closed-loop system and method of transcranial focused ultrasound stimulation to brain targets for managing brain disorders in the central nervous system, with functional guidance provided with electrophysiological source imaging based on personalized functional data.

FIG. 2 shows one embodiment of the invention in which the system and method of stimulating specific brain circuits using electrophysiologically guided, low-intensity ultrasound generated with ultrasound transducer(s) 201 is depicted. One or more elements form the acoustic aperture to generate a specific ultrasound configuration for modulating brain function. The transducer element(s) is mounted over a helmet-like structure 202, with individual element location being registered in reference to the landmarks of a subject's head, thus specific anatomical locations of brain targets. The ultrasound wave 203 is programmed by the console unit 209 and thus beamformed to certain brain targets 205 identified by ESI at specific brain regions. As shown in FIG. 2, the tFUS can be delivered to a specific brain location 205 with customized ultrasound parameters 203, e.g., pulse repetition frequency, duty cycle and intensity. As demonstrated, the whole-head ultrasound array can also be constructed using flexible electronics, for example, a capacitive micromachined ultrasonic transducer-based array. A 3D optical-based mapping system can be used to digitize and guide the positioning of each transducer element. By converting the spatial position of each ultrasound element to a subject-specific time-delay profile of the ultrasound array distributed over the helmet-like structure 202, ultrasound refocusing and electronically steering of the ultrasound beam after penetrating through the cranium bone can be achieved.

To assess the neuromodulatory effect of the tFUS, the EEG electrodes 204 over the scalp under the ultrasound transducer(s) are employed to read the personalized functional data from the brain online or offline 206. A computational device 207 further processes the detected brain responses to the tFUS stimulation, thus imaging the spatial and temporal changes of the brain state 208. The quantified brain signals are employed to inform the configurations of ultrasound waveform 210 through a waveform generation device 209.

Aspects of this embodiment of the invention are also directed to using the non-invasive electrophysiological signals (e.g., EEG) that are recorded before, during and/or after ultrasound stimulation, to quantify the personalized brain response data and further inform and adjust the ultrasound stimulation targeting and dosage accordingly in treating specific brain conditions. The dosages include the temporal profiles of the ultrasound stimulation, such as the waveforms, pulse repetition frequency, duty-cycle, and intensity.

FIG. 3(*a*) depicts one manifestation of ESI guided personalized tFUS, in which the spatial focal spot 304 generated by a single-element transducer 303, 305 working at 500 kHz co-registered with a human skull model. This focal spot was identified based on both personalized structural data 301 acquired from individual magnetic resonance imaging and personalized functional activity reconstruction acquired from 64-channel scalp EEG-based ESI imaging when a human subject was asked to practice repeated motor tasks. The stable brain source 302 was identified at 40 ms after the motion onset and was reconstructed based on minimum norm estimation. The geometrical center or the spatial peak of the reconstructed source was selected to be the target for receiving sonication. The spatial coordinates were provided to an optical-based brain navigator to direct the ultrasound transducer's positioning and orientation executed by a mechanical/robotic clamp/arm 306 mounted on top of a personalized 3D-printed helmet-like structure 307.

Notably, the transcranial ultrasound beam 308 demonstrates a "cigar" shape in the ultrasound near field as well as banded pattern 310 in the ultrasound far field, which renders a low axial specificity for neuromodulation. Some non-negligible hot spots 309 appear due to the ultrasound reflections at some brain-skull interface (e.g., the skull base). FIG. 3(b) depicts both axial views and lateral views of the tFUS pressure field, and it is observed that the improved spatial specificity by increasing the ultrasound fundamental frequency from 500 kHz 311, to 700 kHz 313, and further to 1 MHz 315. Due to the skull thickness and acoustic reflections, significant standing wave patterns 312, 314, and 316 are formed within the skull layer. The transducer has the same curvature radius of 65 mm, and the same aperture width of 30 mm.

Figure 4D:
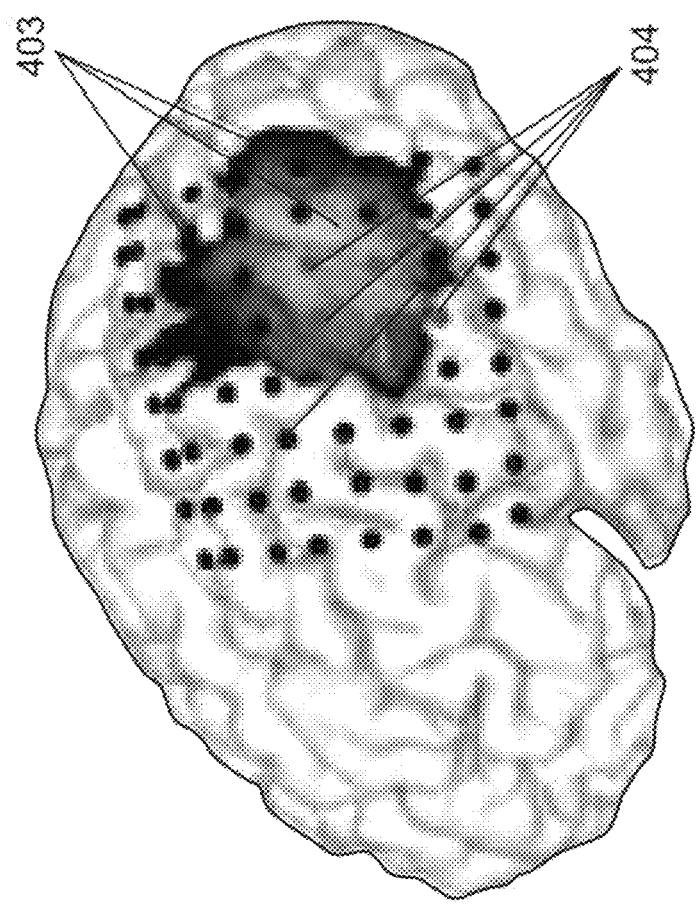
FIGS. 4(a-f) show biomarkers identifying epilepsy.
Figure 4F:
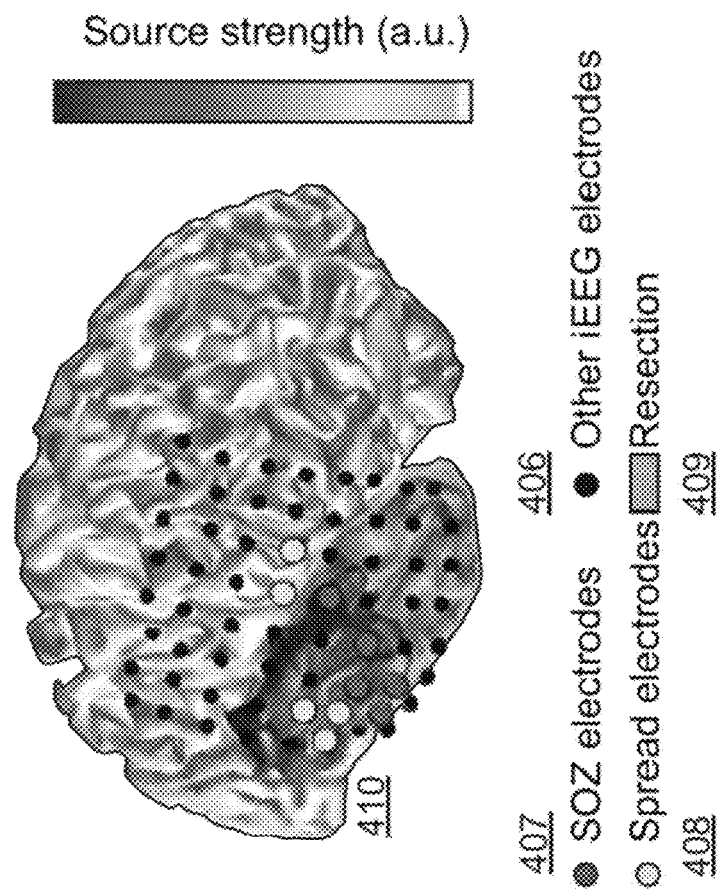
Figure 4E:
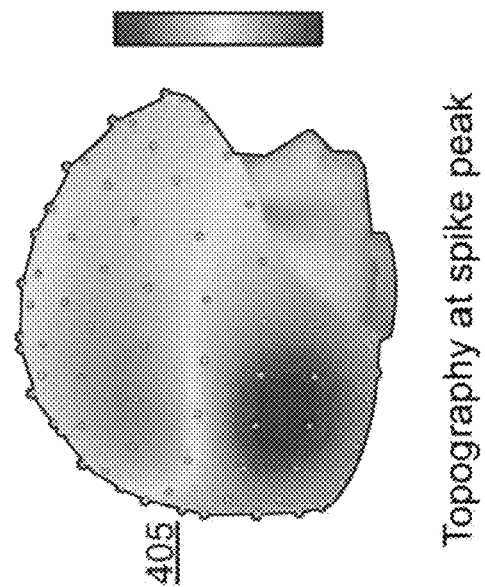

Neural Sensing of Personalized Functional Data—FIG. 4 illustrates personalized biomarkers from EEG and MEG sensing reflecting the underlying pathology for epilepsy. FIG. 4(a) displays EEG waveforms in an epilepsy patient that exhibit resting state 401 and seizure initiation and propagation 402. FIG. 4(b) illustrates interictal spikes in an epilepsy patient which is an electrophysiological manifestation over the scalp EEG of the underlying epileptic networks. FIG. 4(c) illustrates high frequency oscillations above 80 Hz in an epilepsy patient that is co-occurring with interictal spikes. FIG. 4(d) illustrates ESI results 403 that reveal the seizure-onset-zone 404 defined by intracranial EEG recordings in the patient. FIGS. 4(a-d) show neural sensing obtains personalized functional data about the pathology in space and time domains. FIG. 4(d) further demonstrates the capability of ESI in precisely localizing and imaging brain activity that is confirmed by invasive sensing in the individual patient. FIG. 4(e) illustrates a scalp topography 405 of MEG in an epilepsy patient at peak of an interictal spike using 102 magnetic sensors. FIG. 4(e) also shows personalized functional data about this individual subject's epileptiform activity recorded using noninvasive multiple magnetic sensors. FIG. 4(f) shows electrophysiological source imaging result 410 of scalp recorded MEG signals 405, and comparison to intracranial EEG electrodes 406, seizure-onset-zone electrodes 407, seizure spread electrodes 408, and surguca resection area 409 in the patient. FIG. 4(f) shows the ESI imaging result 410 from MEG recordings is able to localize well the epileptiform source activity, cross-validated from invasive seizure activity and successful surgical resection (the patient was seizure free at 1-year follow up post-surgery). FIG. 4 shows that using recording sensors including EEG electrodes and magnetic sensors, personalized functional data can be obtained non-invasively about the underlying epileptic brain activity.

Figure 5A:
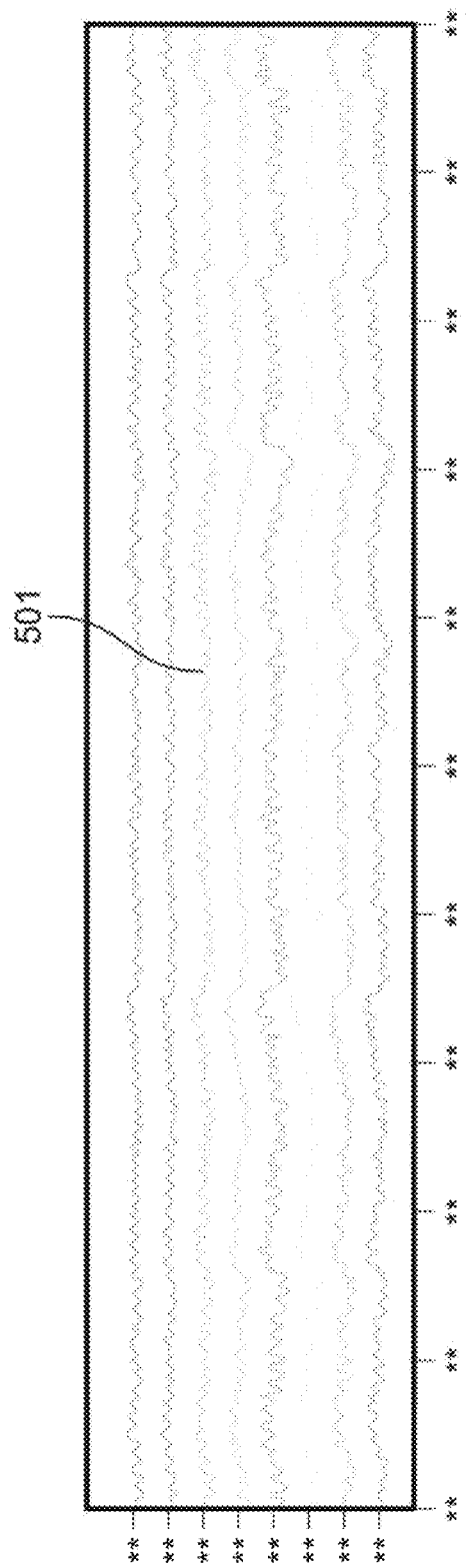
FIGS. 5(a-b) show EEG waveforms of a subject with pain and scalp topographies derived from EEG measurements in subjects with meditation training.

In one example of neural sensing, EEG was used to record and quantify pain in human subjects. FIG. 5(a) illustrates EEG waveforms 501 in several scalp electrodes when the subject underwent pain induced by thermal stimulation. Such personalized functional data in terms of EEG measurement can be used to quantify pain to derive features for adjustment of ultrasound stimulation parameters. As an example of personalized functional data acquired from EEG in patients of sickle cell disease pain, the EEG power spectral analysis showed that the patient group tended to have more power in the low frequency bands (delta, theta, and alpha) and less power in the high frequency bands (beta1, beta2, and gamma). The average power values showed that significant differences were found in theta band between controls and patients, and beta2 band between controls and patients. It is further observed that ESI results showed greater brain activity for the patient group in the prefrontal cortex, left Rolandic operculum, left insula, left putamen, and the caudate nucleus. A majority of these regions are known to be active during pain processing. This result indicates the capability of neural sensing in detecting functional data about the pain and localize and image neural circuits that are involved in pain processing. Based on such personalized functional data, ultrasound stimulation beams can be targeted at locations of the neural circuits involved in pain processing.

In one example of noninvasive neural sensing from electrophysiological measurements, personalized functional data in human subjects with thermal pain is sensed from EEG measurements. The efficacy of the pain quantification approach was tested both across subjects and within subjects. To test performance across subjects, Leave-One-Out Classification was used to train the classifier across 24 subjects and test on one subject. The wavelet power spectrum of each time instant of a group independent component, along with the corresponding discrete pain scores was used as data for a random forest model.

The goal was to find the model and the corresponding group independent component that contained the best representation of the pain response. Each model was trained on two-thirds of the training data using various resolutions of the continuous pain score, and cross validation was performed on the remaining ⅓ of the training data where the accuracy of each model was returned. The model returning the best cross-validation performance metrics, along with the spatial independent component weights corresponding to the most discriminative group independent component used in the testing phase shows balanced classification accuracies at different resolutions of the continuous pain score for classification across subjects. The mean classification accuracy for predicting pain based upon individual EEG for a range of 1-10 is 89.45%, demonstrating that personalized functional data about the pathology (pain level in this case) can be accurately sensed and quantified from noninvasive EEG measurements. Such pain quantification based upon personalized functional data can be used to adjust and optimize the dosage of ultrasound stimulation.

Figure 5B:
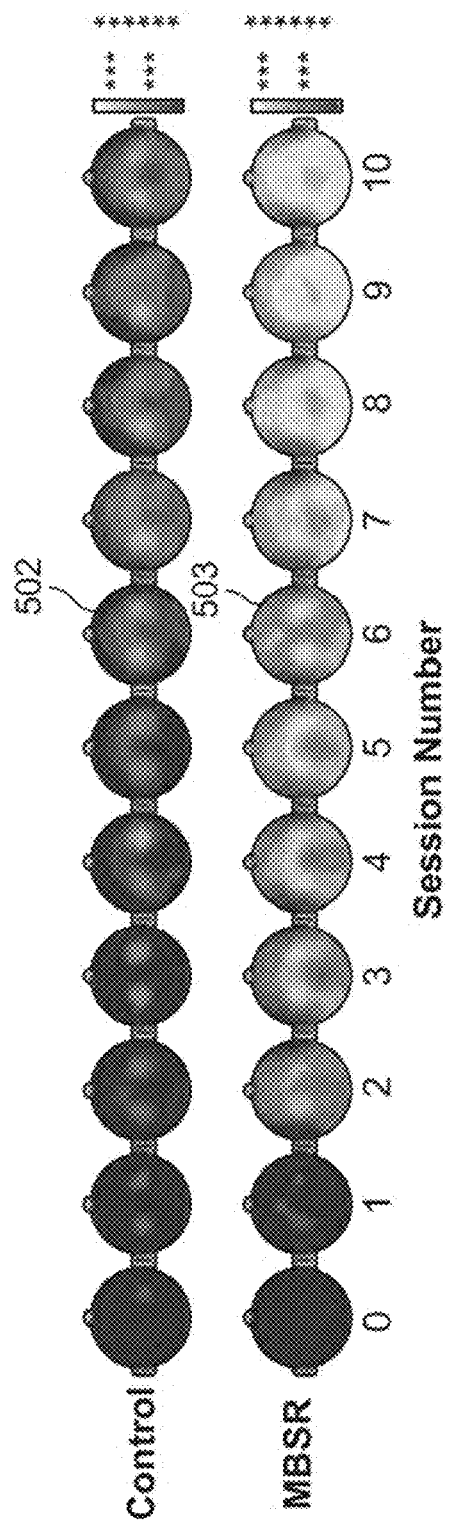

Electrophysiological neural sensing can not only distinguish pathological conditions from normal physiological statues, but also quantify changes in normal brain activity due to unique training or mental practice such as mindful meditation training. FIG. 5(b) shows the difference between the scalp distributions (Fisher score) of EEG alpha power during hand movement imagination, at each electrode throughout training (x-axis=session number). During the process, the control group (top row), who did not practice mindful meditation, displayed the pattern 502 in that the difference between motor imagery and rest is determined by the presence or absence of activity over the motor cortex. On the other hand, the MBSR (Mindfulness-based Stress Reduction) group (bottom row), who underwent an 8-week mindful meditation training, produced an entirely different pattern 503 of contrast that evolves throughout training.

Meditation-trained participants learned to dramatically alter both the amplitude and the spatial pattern of their alpha power during brain-computer interface control when subjects imagined hand movement to control a computer cursor. FIG. 5(*b*) demonstrates that EEG neural sensing detects and quantifies personalized functional data reflecting the behavioral history of meditation training. Such personalized functional data suggests the possibility to identify neural circuits correlated to certain behaviors such that they may be used to guide ultrasound neuromodulation to improve the cognitive and emotional behavior of a subject.

Figure 6:
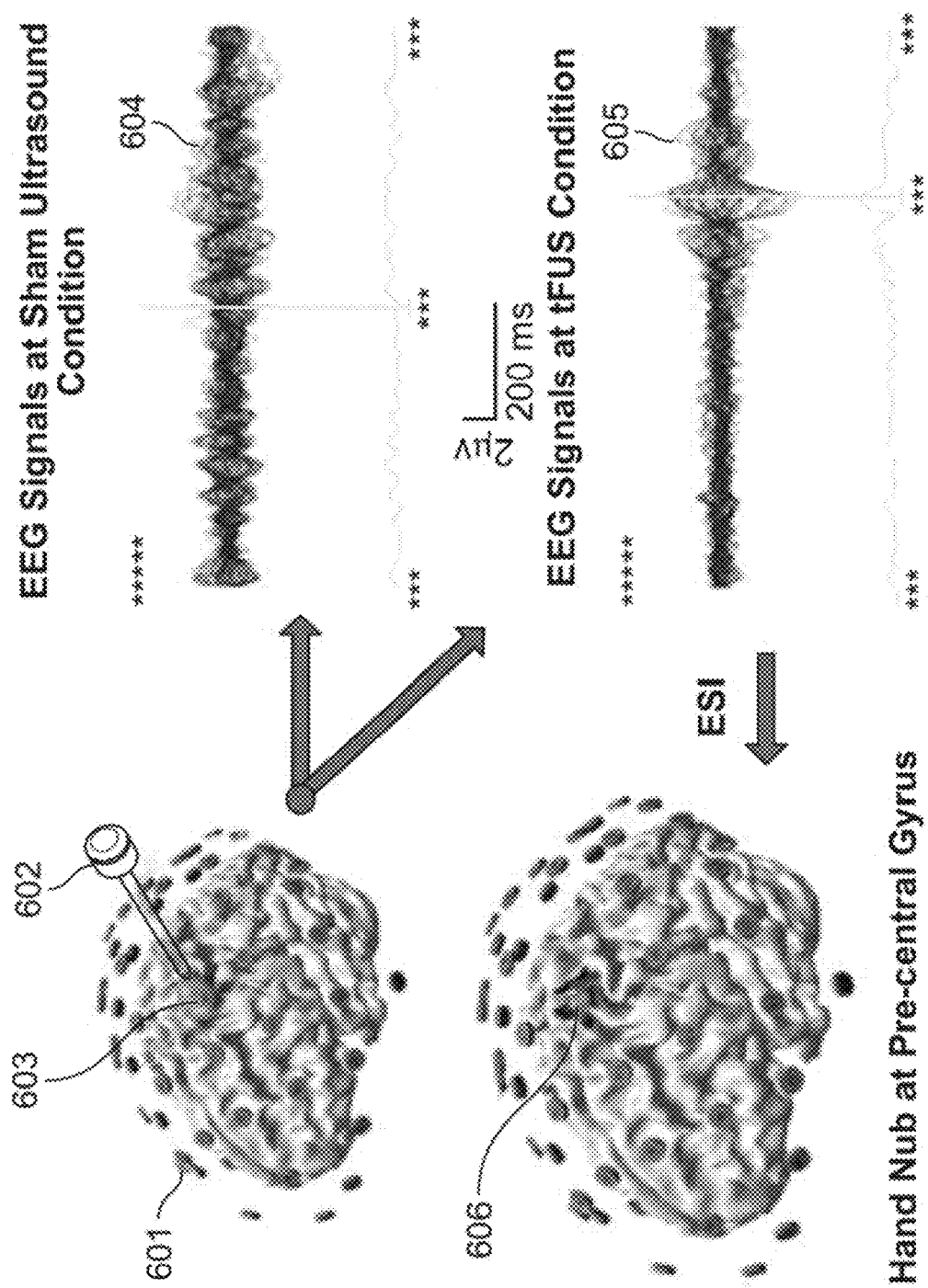
FIG. 6 is a graph illustrating the initial brain activation by low-intensity transcranial focused ultrasound stimulation with simultaneous scalp EEG-based source imaging on a human brain with improved spatial definition, guidance and feedback.

FIG. 6 demonstrates other embodiments of the present invention which uses the scalp EEG (surface electrodes 601) based ESI imaging to track the in vivo ultrasound beam location. In these embodiments, low-intensity tFUS was used to elicit focal brain activations at the brain target (605 in contrast to the sham ultrasound condition 604). The ESI functionally informs the spatial targets of low-intensity tFUS brain stimulations based on individual brain structural model (e.g., in a human brain). This embodiment of the invention leverages the subject's brain model pre-scanned by MRI for personalized anatomical landmarks and skull model pre-scanned by computed tomography (CT) for personalized acoustic field modeling and verification. The initial phase (e.g., <100 ms) of the tFUS-evoked brain response captured by the ESI provides reliable personalized functional data about spatial information of ultrasound beam targeting. For an instance, to treat certain neurological disorders in the brain, this ESI-informed (localized brain source activity 606) personalized targeting confirms the location of spatial focus 603 of ultrasound energy 602 at one or more relevant brain regions. This implementation demonstrates the efficiency and effectiveness of the invention to precisely localize the brain target for personalized tFUS stimulation based upon personalized functional data sensed by EEG and imaged by ESI.

In an example of ESI Guided Ultrasound Neuromodulation for Somatosensory Enhancement, tFUS stimulation at the primary somatosensory cortex (S1) with guidance from personalized scalp EEG measurements and ESI imaging is shown. Balanced peripheral stimulation frequency changes (i.e., increased/decreased/maintained tactile frequencies), were introduced. 64-channel EEG was recorded simultaneously during the behavior task and brain electrophysiological responses were investigated at both sensor and source domains to investigate the effect of tFUS stimulation on the brain activities during the sensory discrimination task.

Nine healthy participants were recruited in this experiment (4 females and 5 males, mean age of all participants: 35.77±14.06 years). Before the EEG-tFUS experiment, each individual participated in a 3-T MRI scanning to obtain magnetization-prepared rapid gradient-echo T1-weighted brain structural images. The personalized structural MRI was collected to establish individualized brain anatomical model, helping to identify the brain target for topological and geometrical segmented brain surfaces, thus guiding the low-intensity focused ultrasound energy onto the subject-specific primary finger sensory cortical region based on a finger sensation map.

Each participant attended a sensory task in which computer-programmed mechanical vibrations were delivered to a flat metal plate held between the thumb and index fingers of the right hand when seated. 64-channel EEG data were simultaneously acquired, with FCz and AFz set as reference and ground electrodes, respectively. The EEG signals were sampled at 5 kHz. Positions of electrodes were digitized over each subjects' scalp using an EEG PinPoint system. The ultrasound transducer was mounted over the EEG cap by a 3D-printed helmet, of the type shown as reference 307 in FIG. 3. An optical-based brain navigation system was employed with the input of the structural MRI data and optical markers attached on the forehead to track the position and orientation of the ultrasound transducer in real time.

Figure 7:
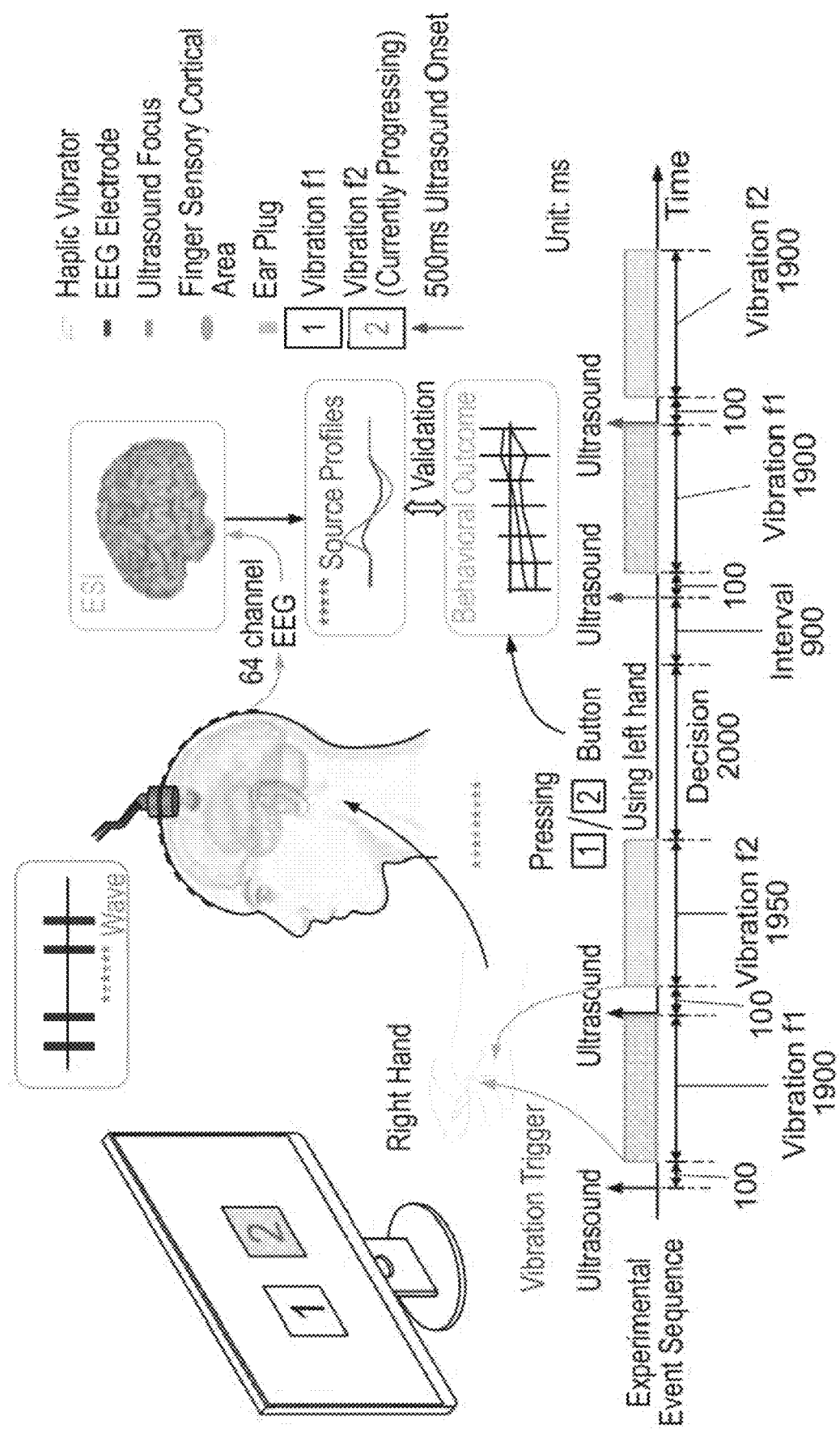
FIG. 7 shows the workflow of electrophysiological source imaging guided focused ultrasound stimulation at somatosensory cortex during a concurrent sensory task.

The overall experiment setup and procedure is shown in FIG. 7. The sensory task was repeated in two different sessions (i.e., Sham US (ultrasound) and UPRF (ultrasound pulse repetition frequency) 300 Hz). In each session, subjects were presented with a pair of vibration stimuli with different frequencies (i.e., f1 and f2) and respective visual cues in each of total 56 trials. In each trial, the subjects were instructed to select the one with a higher vibrating frequency by pressing a corresponding button. The pair of vibration stimuli consisted of one vibration frequency (i.e., f1) fixed at 130 Hz and another frequency centered at 130 Hz with a randomized frequency shift among 7 different levels: 0, 4, 8, 12, 16, 20, 24 Hz, with equal probability to increase or decrease. Each vibration lasted for 1.9 seconds. For each shifted frequency level, 4 trials with increasing shifted frequency and 4 trials with decreasing shifted frequency were presented in one session. The order of these trials was randomized. The mechanical vibrations were delivered to the subject through a flat plate held between the thumb and index finger of the right hand. The amplitude at each vibration frequency among the overall range of 106 to 154 Hz was normalized using a force sensor. The vibrational frequencies were generated and played from a computer program and were further converted to the mechanical vibration on the plate through a driving board. The possible audible sounds produced by the gentle vibration of the plate is further minimized by applying ear plugs.

During the session, the visual cues were displayed on a 24-inch LCD monitor with a viewing distance of 50 cm. Two blocks on the screen with the digit "1" and "2" inside indicated the first and the second vibration in one trial. When the vibration was presented, the corresponding block was highlighted and turned red as a visual cue. After two vibrations presented, each subject had 2 seconds to decide and select the one with a higher vibrating frequency. The entire keyboard was divided and labeled as two parts (i.e., 1 or 2), and the subject was able to press any key in the corresponding side using the left hand to report the selection, which minimized the motion of selection. As visual feedback and confirmation, the background of the corresponding block on the screen turned to gray after the selection was reported.

The subject was allowed to skip without pressing any button if they considered the two vibrating frequencies were equal. The subject can change their selection during the decision period. After the decision period, the subject had 1 second of rest interval before the start of the next trial. Their selections during all trials were recorded and saved after the completion of the entire session.

As illustrated in the experimental event sequence (the bottom panel of FIG. 7), pulsed ultrasound stimulations were delivered to the finger representation area of S1 at 100 ms before the onset of each vibration stimulus to the fingers. Each sonication lasted for 500 ms with an ultrasound pulse repetition frequency (UPRF) of 300 Hz practiced in the session (denoted as "UPRF 300 Hz" condition). In addition, a sham ultrasound session was also conducted with active acoustic transmission, but the ultrasound is physically decoupled to the scalp by 4-6 centimeters (denoted as "Sham US" condition). The sham condition with active acoustic transmission controls for confounding factors such as audible sound generated from the UPRF and electromagnetic interference. The order of the sessions/conditions was also randomized when presented to the human subject.

A single element focused transducer with an element diameter of 25.4 mm and a focal length of 38.1 mm was used in this study. A 3D-printed collimator (an outlet diameter of 18 mm and a height of 20 mm) filled with ultrasound transmission gel was attached to the transducer for an improved coupling of ultrasound to the scalp. The focused ultrasound wave was generated by the ultrasound transducer, which was driven by two function generators and subsequently a radiofrequency power amplifier. The first function generator, synchronized by a TTL (transistor-transistor logic) signal from the computer to trigger ultrasound pulses, thus generating the specified number of pulses at the UPRF of 300 Hz. The second function generator, triggered by the output of the first one in a burst mode, was employed to engender ultrasound fundamental frequency (UFF) and determine the cycles per pulse (CPP) number.

Figure 8A:
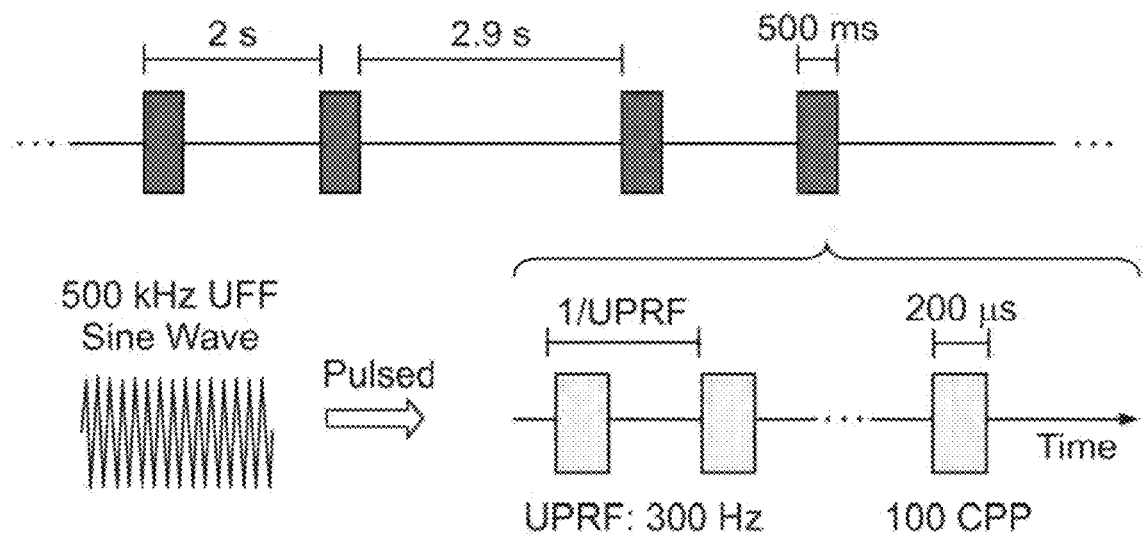
FIGS. 8(a-e) illustrate ultrasound parameters used for the somatosensory ultrasound neuromodulation.
Figure 8B:
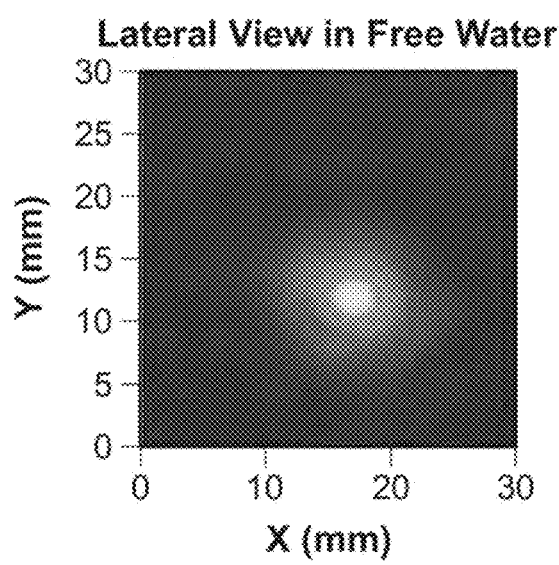
Figure 8C:
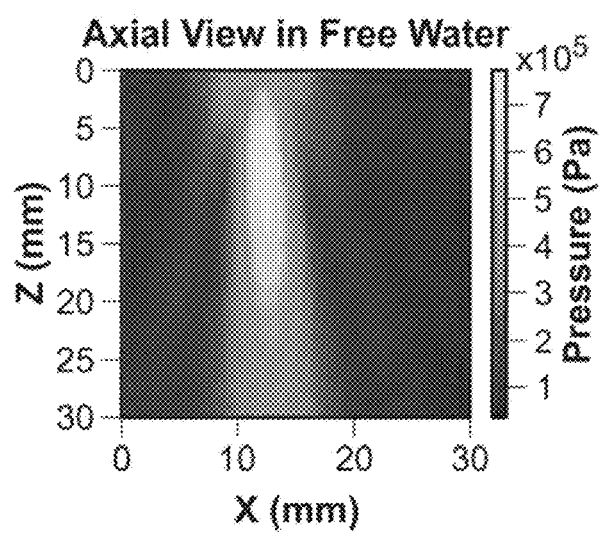
Figure 8D:
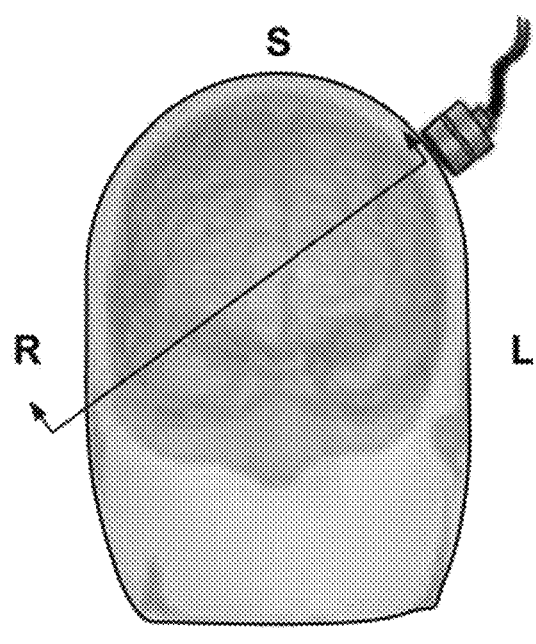
Figure 8E:
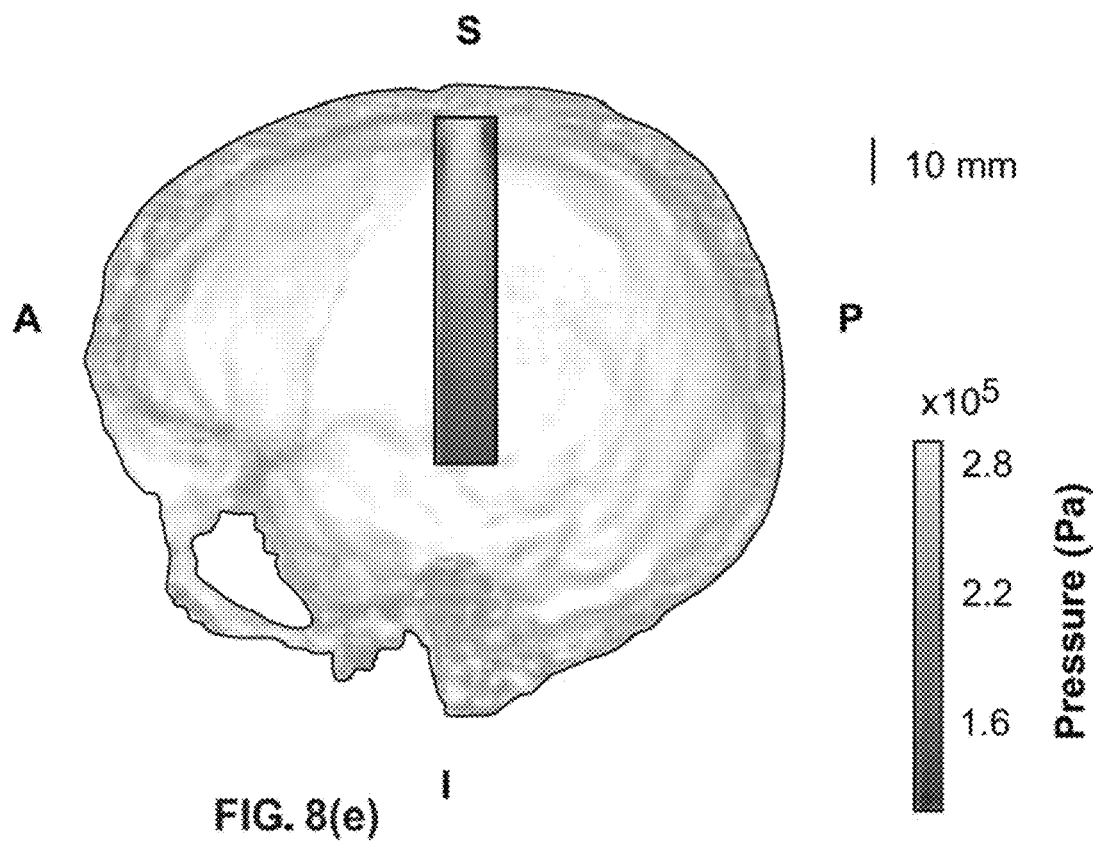

The ultrasound temporal profile is depicted in FIG. 8(a). The ultrasound setup used a UFF of 0.5 MHz, CPP number of 100. Each sonication lasted for 500 ms with a UPRF of 300 Hz. The spatial peak ultrasound pressure applied to the scalp was measured as 780.4 kPa (FIGS. 8(b-c), spatial-peak pulse-average intensity $I_{SPPA}$: 5.64 W/cm$^2$, spatial-peak temporal-average intensity $I_{SPTA}$: 338.28 mW/cm$^2$), with an estimated ultrasound pressure of 286.0 kPa ($I_{SPPA}$:1.10 W/cm$^2$, $I_{SPTA}$: 67.13 mW/cm$^2$) arriving at the targeted cortical brain. The axial view of the transcranial ultrasound pressure field is presented in FIG. 8(e), which is also co-registered with an intersectional view as indicated in FIG. 8(d) of a human skull model. This pressure estimation was based on a 3-dimensional transcranial ultrasound scanning using a needle hydrophone in the presence of a real human hydrated skull sample.

For each session, the order of the actual vibration frequencies was saved and converted to a list of indexes of the higher frequency in each trial. The subject's selections during the experiment were also saved and compared with the ground truth to calculate the percentage of responses correct (PRC) for each shifted frequency level (7 PRC measurements for each session).

EEG data were band-pass-filtered from 1 to 45 Hz. Independent component analysis (ICA) was performed to remove components related to eye movements. Data trials were extracted from 0 to 600 ms, while data from −400 to 0 ms were used as baseline and removed after normalization (time 0 was the ultrasound onset). Data in each session were averaged over trials to obtain the ultrasound-evoked brain activities. The EEG temporal profiles and the topographic voltage maps of the ultrasound-modulated brain activities were plotted. A non-parametric permutation-based t-test was performed to assess the statistics of the averaged EEG signal from four electrodes closest to the target brain region in the two experiment conditions.

Individual MRI data was co-registered with the digitization of the EEG electrodes. The individualized head boundary element model was further created for each participant. The averaged ultrasound-modulated somatosensory brain activities in each condition for all participants were processed following the ESI pipeline. The minimum norm imaging algorithm was applied to solve the ESI inverse problem and further reconstruct the current source density (CSD) at the cortical regions of interest (ROI).

A finger representation area of 3.8-4.2 cm$^2$ on the primary somatosensory cortex in the left hemisphere was selected as the brain ROI, and the averaged source amplitude, denoted as the sensory source profile amplitude (SSPA), within this ROI was extracted for further statistical analyses. A one-tail paired Wilcoxon signed rank test was performed to investigate the statistics of the SSPAs in the two experiment conditions with a null hypothesis that the SSPA in the UPRF 300 Hz session was no greater than that in the Sham US session. Note that the SSPA is defined as the difference between the maximum and the minimum of averaged CSD in time.

Figure 9B:
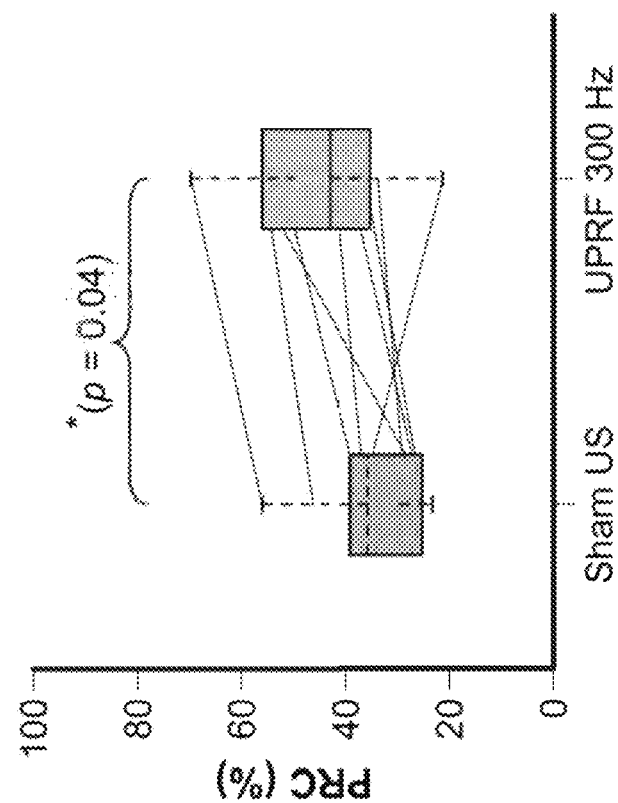
FIGS. 9(a-b) illustrate the percent of response correct for each shifted vibration frequency studied and for comparison between UPRF 300 Hz and Sham ultrasound conditions.
Figure 9A:
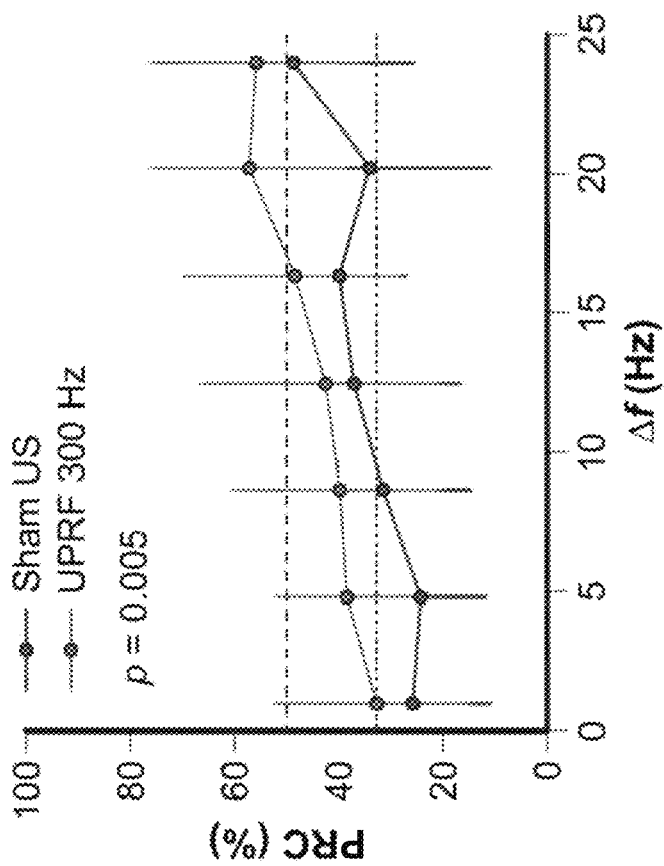

The behavior results are depicted in FIG. 9. As illustrated in FIG. 9(a), a two-way analysis of variance (ANOVA) test is conducted on PRC data of all subjects to examine the effect of shifted frequency levels and ultrasound conditions. PRCs were then averaged across shifted frequency levels, sessions and subjects. Error bars in standard deviations were plotted for the behavioral data visualization. In FIG. 9(b), the statistics of the PRC averaged across all shifted frequency levels in UPRF 300 Hz sessions in comparison with those in Sham US were assessed by a one-tail paired Wilcoxon signed rank test with a null hypothesis that the PRC in the UPRF 300 Hz session was no greater than that in the Sham US session.

Each line in FIG. 9(a) represents the averaged PRC over subjects (N=9) with respect to different shifted vibration frequency level in each condition. In both conditions, the PRC increases as the shifted frequency increases. As the subjects were asked to skip pushing buttons if the two frequencies were considered equal, three options were provided for each decision and the chance level was 33%. In Sham US, the average PRC across all shifted frequencies was 34.92% and the mean PRCs were above the chance level when the shifted vibration frequencies were greater than 8 Hz. In UPRF 300 Hz, PRCs were greater than the chance level at all shifted frequency levels, while the overall PRC reached 45.24%. A testing threshold, which was defined as the minimum shifted frequency while the PRC reached 50%, became lower in UPRF 300 Hz condition than that in Sham US. As the result presented in FIG. 9(a), the ANOVA test is conducted on PRC data of all subjects to examine the effect of shifted frequency levels (7 levels) and ultrasound conditions (Sham US and UPRF 300 Hz). The result shows that both shifted frequency levels ($F_{6,112}$=2.87, p=0.012, effect size $\eta_p^2$=0.13) and ultrasound conditions ($F_{1,112}$=8.37, p=0.005, effect size $\eta_p^2$=0.07) have statistically significant effects on the PRC, which indicates that tFUS increases the subjects' discrimination ability in sensing the frequencies of mechanical vibrations. No significant interaction between the effect of shifted frequency levels and ultrasound conditions was observed ($F_{6,112}$=0.39, p=0.88, effect size $\eta_p^2$=0.02). As another result shown in FIG. 9(b), a one-tail paired Wilcoxon test was also implemented to examine the null hypothesis that the PRC in UPRF 300 Hz condition would be no greater than that in Sham US condition. As a result, it showed significant improvements (p=0.048, effect size r=0.39) of subjects' median PRC during UPRF 300 Hz in comparison with those in the Sham US condition. These data support the contention that ultrasound increases the overall PRC compared with the sham condition.

Figures 10G, 10H, 10I:
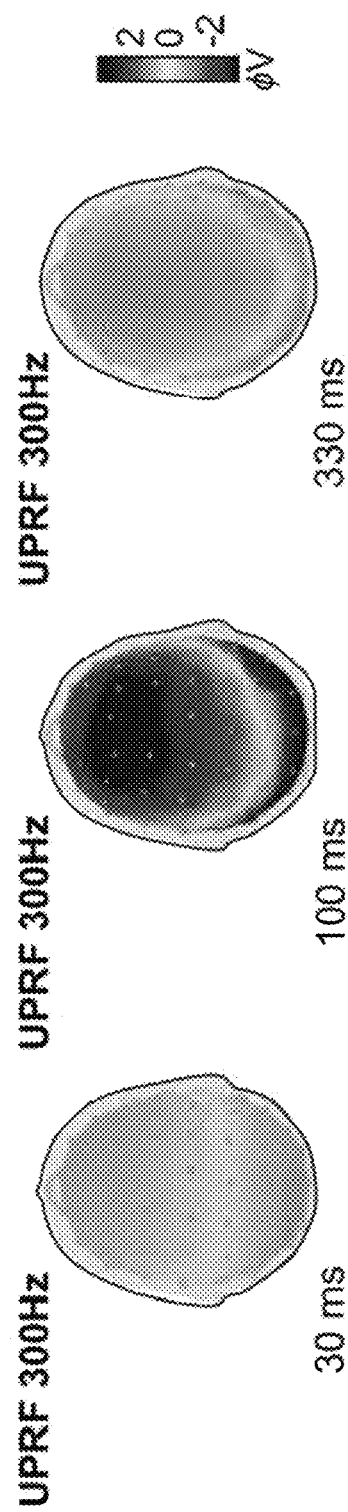
FIGS. 10(a-i) illustrate EEG signals and scalp topographies corresponding to somatosensory ultrasound stimulation.
Figure 11A:
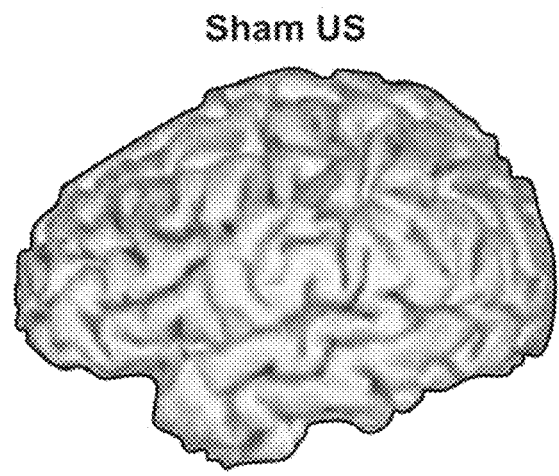
FIG. 11(a-f) illustrate personalized functional data derived from electrophysiological source imaging corresponding to somatosensory ultrasound stimulation.
Figure 11B:
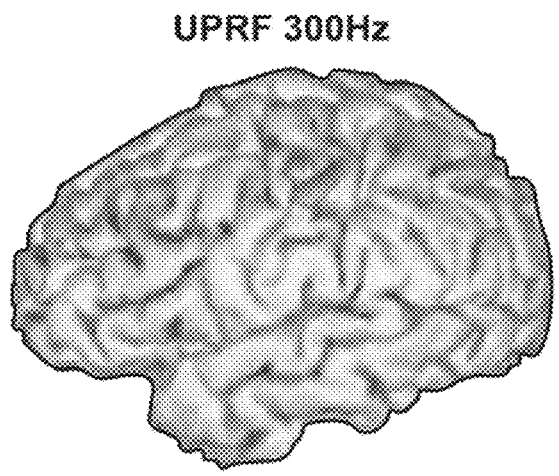
Figure 11C:
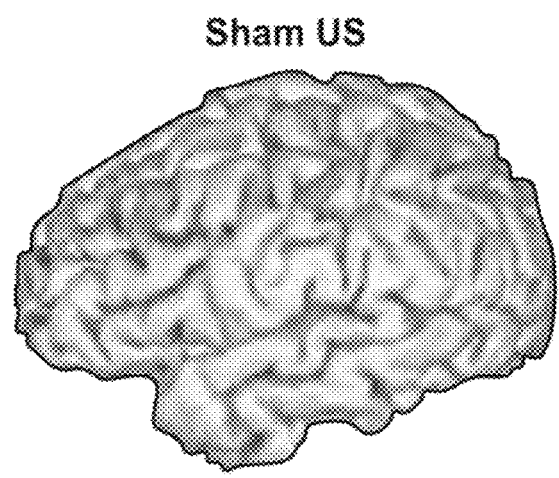
Figure 11D:
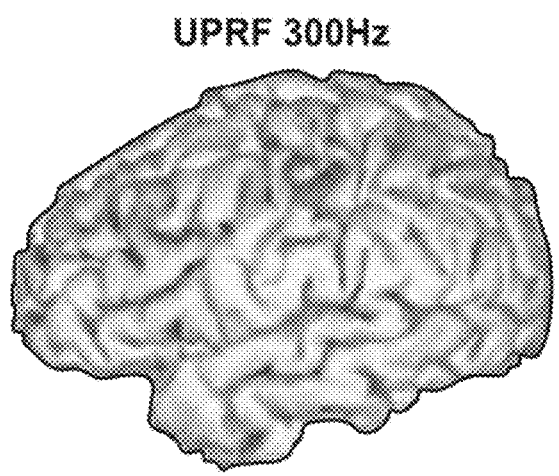
Figure 11F:
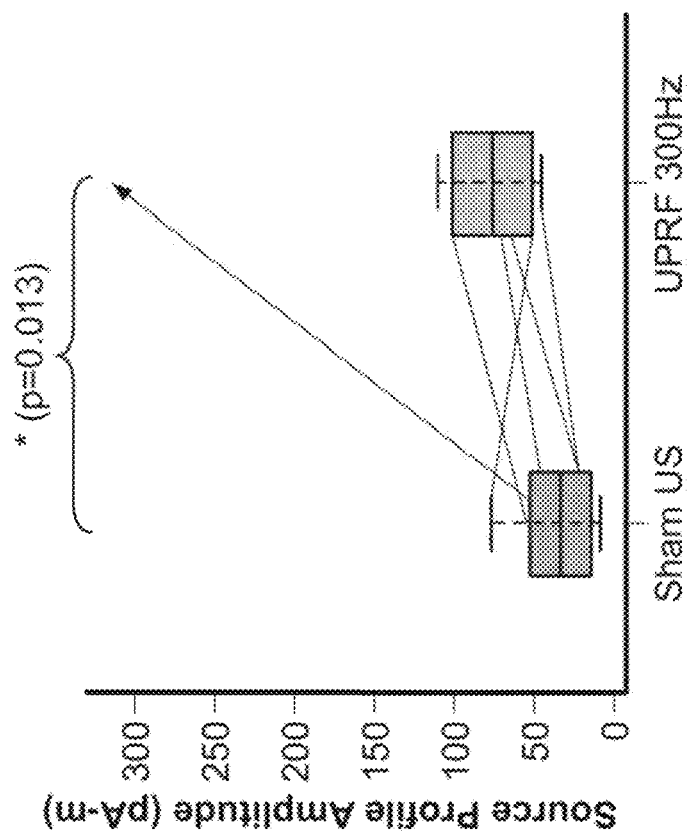
Figure 11E:
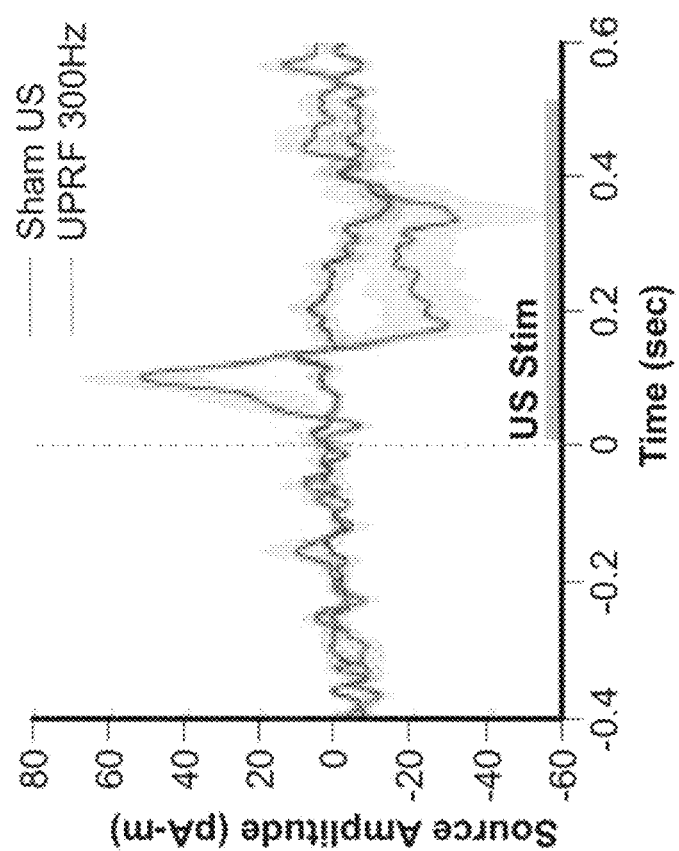

The averaged 64-channel EEG sensor-level result across multiple subjects (N=7) is shown as butterfly plots in FIGS. 10(a-b). Due to relatively severe body movements during the task, two subjects with poor EEG signal quality were excluded for further data analyses. The vibrational sensory-evoked brain activities in Sham US and UPRF 300 Hz conditions are depicted. In FIG. 10(c), the averaged EEG signal of C3, C5, CP3, CP5 (N=7) are shown as solid lines, which are the four electrodes closest to the brain region of the ultrasound neuromodulation. The shaded areas under the solid lines represent the standard error of the mean (S.E.M.), and gray vertical bars indicate those temporal segments in the UPRF 300 Hz condition which are significantly different from the signal in Sham US condition (p<0.05, nonparametric permutation-based t-test). Compared with the Sham US condition, the N30, P100-N170 components are significantly enhanced with the neuromodulation in UPRF 300 Hz. The existent N300 component in Sham US condition is also modulated in the UPRF 300 Hz condition which shows statistically significant differences when comparing to the tFUS condition. Topographic maps of the averaged EEG signal, under each condition at 30 ms, 100 ms and 330 ms when the statistical significance is shown, are presented in FIGS. 10(d-i). The topographic maps are displayed in the grand average reference montage. At 30 ms and 100 ms, shown in FIGS. 10(g-h), the topographic maps of UPRF 300 Hz condition show different spatial patterns with stronger activations in frontal and temporal lobes than those of Sham US. At 330 ms, the topo map in UPRF 300 Hz condition presents a similar spatial pattern as in the Sham US but with a stronger magnitude.

FIGS. 11(a-d) show the ESI imaging results at 100 and 330 ms under Sham US and UPRF 300 Hz conditions. At 100 ms, shown in FIG. 11(a), there is no significant brain activation (maximum CSD of 15.5 pA·m on the S1 in the Sham US condition, whereas the activation appears at the S1 in UPRF 300 Hz condition with the maximum CSD of 565.1 pA·m, as shown in FIG. 11(b). At 300-400 ms, the S1 activation with maximum CSD of 92.9 pA·m exists in Sham US condition, as shown in FIG. 11(c), and more sensory cortical activations are localized in the UPRF 300 Hz condition with a higher CSD maximum value of 576.7 pA·m, as shown in FIG. 11(d). The green patches in FIGS. 11(a-d) are used to identify the ROI in this study (i.e., the finger representation area on the S1 in the left hemisphere). The averaged CSD (N=7) of this ROI in each condition is extracted from the identified area of 4 cm² and presented in FIG. 11(e). The grand averaged CSD is depicted with solid line profiles, and the shaded areas indicate the S.E.M. In the early SEP source complex during 90-110 ms, the grand averaged SSPA is 51.7 pA·m in UPRF 300 Hz condition comparing to the much less mean amplitude of 5.0 pA·m in the Sham US. In the late SEP source complex during 300-400 ms, the absolute value of SSPA is increased from 13.4 in Sham US condition to 31.0 pA·m in UPRF 300 Hz. Furthermore, as illustrated in FIG. 11(f), the source profile amplitude is significantly increased in the UPRF 300 Hz condition compared with that in the Sham US, examined by a one-tail paired Wilcoxon signed rank test (p=0.026, effect size r=0.51).

Overall, in this exemplary embodiment of the invention, the behavior results illustrated that subjects exhibited a higher overall PRC when their central sensory brain circuits were modulated with tFUS in comparison with the sham condition. These results revealed that low-intensity tFUS stimulation at the S1 may improve the vibration frequency discrimination capability. Given the behavior outcome, a fundamental question remains that whether the frequency discrimination enhancement is due to the inhibitory or excitatory neuromodulation effects of tFUS. To directly address this question, multi-channel EEG were simultaneously recorded to objectively assess the personalized brain responses to the sensory input and performed analyses on concurrent EEG data at the sensor and source domains to uncover electrophysiological evidence. In the sham condition, a negative peak occurred 200 ms after the onset of the vibration stimuli which corresponded to the N300 component in the temporal signal (vibration stimuli were presented 100 ms after ultrasound onsets). The cortical source amplitude of this component indicated that the finger representation areas at the primary somatosensory cortex was activated during the task. When tFUS was delivered to S1, a significant difference from the sham condition showed that the magnitude of the N300 component became enhanced at the sensor level. The reconstructed source results also showed that the activation on S1 demonstrated a higher source profile amplitude. The early phase (e.g., <150 ms) of the SEP (somatosensory evoked potential) enhancement is deemed to be associated with excitatory effects on the afferent vibrotactile signal transmission and brain processing at the specific primary somatosensory cortex (S1). The increased excitability of the S1 due to the ultrasound modulation may be responsible to such excitatory effects, which does not exclude the possible ultrasound-evoked potential in addition to the SEP at S1. The late phase (e.g., >200 ms) of the enhanced SEP may be related to the increased associative cortical reactions for the secondary somatosensory information processing occurring at the adjacent brain circuits. The increased S1 activities may provide enhanced communications to the associative brain network. These results show that tFUS stimulation targeting the activated brain area in the sensory task may increase the local brain excitability, thus leading to the enhancement of sensory discrimination capability.

Another example of ESI guided Ultrasound Stimulation for Motor Potential Modulation will now be presented. In this example, it is shown how tFUS influences the human voluntary motor processing in the brain with guidance from personalized functional data obtained from EEG ESI. Low-intensity tFUS was applied to modulate the movement-related cortical potential (MRCP) originating from human subjects practicing a voluntary foot tapping task. 64-channel EEG is recorded concurrently and further used to reconstruct the brain source activity specifically at the primary leg motor cortical area using the ESI. The ESI illustrates the personalized ultrasound modulated MRCP source dynamics. The MRCP source is imaged and its source profile is further evaluated for assessing the tFUS neuromodulatory effects on the voluntary MRCP. Moreover, the effect of UPRF is further assessed in modulating the MRCP. The personalized ESI results show that tFUS significantly increases the MRCP source profile amplitude (MSPA) comparing to a sham ultrasound condition, and further, a high UPRF enhances the MSPA more than a low UPRF does. This example demonstrates the neuromodulatory effects of the personalized low-intensity tFUS stimulation on enhancing the human voluntary movement-related cortical activities and illustrates one example implementation of the present invention.

Fifteen healthy human subjects were recruited in this experiment. Prior to the tFUS-EEG session, each participant received a 3-Tesla magnetization-prepared rapid gradient-echo T1-weighted structural MRI to establish high-resolution individual brain anatomical models. The models were later used to identify the brain target for guidance of the low-intensity focused ultrasound focus. Based on the reconstructed results from the topological and geometrical segmented models of brain surfaces, we identified the subject-specific primary leg motor cortical region by referring to the essential motor functional areas distribution over the identified primary motor cortex.

During the tFUS-EEG session, the subject was seated and a 24-inch LCD monitor with a viewing distance of 50 cm was used to instruct each subject to start or stop voluntary foot pedaling. During the task, an accelerometer mounted on a foot pedal detected and transmitted the fast motion of foot pressing to an ExG AUX Box. Concurrent 64-channel EEG data were acquired with electrode positions FCz and AFz chosen as reference and ground. The ultrasound transducer was held and mounted on top of the EEG cap using a 3D-printed helmet. An optical-based brain navigation system was utilized with the input of the structural MRI data and an optical marker attached over the forehead to track and guide the position and orientation of the ultrasound transducer in real time.

A 3D-printed collimator was attached to the transducer to match the focal length of the transducer with the estimated physical distance from the acoustic aperture to the targeted motor cortex. The ultrasound signal was generated by two function generators and amplified by a radiofrequency power amplifier driving the ultrasound transducer. The first function generator was triggered by an output signal from a home-made circuit based on a fast and precise voltage comparator with onboard latching function, which was monitoring the output from the accelerometer in real time and synchronizing the sonication with the motion onset. This output trigger signal was further stretched to 5 ms long by TriggerBox for synchronization with EEG recordings. Once triggered, the first function generator was used to create the UPRF and determine the number of pulses. The second function generator was triggered by the output of the first one in burst mode and generated ultrasound fundamental frequency (UFF) of the sinusoidal waveforms and determined the number of cycles per pulse (CPP).

This study used a UFF of 0.5 MHz, CPP number of 100. Each sonication lasted for 500 ms with two levels of UPRF (i.e., 300 and 3000 Hz practiced in two sessions, denoted as "UPRF 300 Hz" and "UPRF 3000 Hz", respectively). The EEG was sampled at 5 kHz and filtered using a bandpass filter with the lower cut-off frequency at 1 Hz and the higher cut-off frequency at 45 Hz. The pre-stimulus period was set as 400 ms before the trigger signal, and the period of 600 ms after the onset of the trigger signal was deemed as post-stimulus period in EEG individual epoch. Independent component analysis (ICA) and/or signal-space projection (SSP) were used to identify and clean artifacts, mainly the strong eye blinking during the voluntary movement. The MRCPs in the time domain were normalized against the first 100 ms during the pre-stimulus period. The 1-second EEG epochs were then averaged across the trials for each experimental condition by aligning the detected trigger signal. For EEG-based source modeling and ESI imaging, the boundary element head model for each human subject was built which consisted of three layers (i.e., scalp, skull and brain) with relative conductivities of 1, 0.0125 and 1, respectively. The minimum norm imaging was used to solve the inverse problem, thus reconstructing the cortical source activity.

Further, a source patch with an area of 3.2-4 $cm^2$ from the primary leg motor area of reconstructed MRCP source activity was taken. The measurement of MRCP source was the averaged activity across the patch. The temporal dynamics of the MRCP measurements were depicted as a time profile within the 1-second epoch period. The peak-to-peak amplitude of MRCP source profile was then used for comparisons and statistical analyses. The statistical analyses focused on the tFUS modulation of the amplitude of MRCP source profiles. The first null hypothesis to be tested is that the MRCP source profile has no greater amplitude in the tFUS conditions than that in the sham condition. For testing this hypothesis, one-tail nonparametric paired Wilcoxon rank sum test was performed to examine the tFUS effects. The second null hypothesis is that the UPRF change will have no effect on the MRCP source amplitude. The Kruskal-Wallis rank sum test was performed to examine this hypothesis. Next, paired Wilcoxon test was further employed to assess whether the increased UPRF will lead to a stronger neuromodulation effect. For both statistical tests above, a Shapiro-Wilk test for examining data normality was performed. In addition, due to the correlation between the MRCP amplitude and movement strength, we investigated whether there were significant differences regarding the foot pedaling strength across different sessions for each subject, we did non-parametric permutation-based tests on the motion and EMG signals for ruling out such a possible confound.

The multi-channel EEG illustrate a significant increasing in terms of sensor-level MRCP amplitude due to the presence of tFUS at the left primary leg motor area. Such EEG signal amplitude increases were specifically detected at electrodes C1, FC1, Cz, CPz and CP1, located close to the targeted brain area. In the Sham US condition only with right foot pedaling, the EEG voltage topography map reflected a mild activation at 17 ms majorly at the left-brain hemisphere.

By applying the EEG-based ESI source imaging, we further localized the MRCP source activity at the precentral gyrus of left hemisphere (i.e., the primary motor area). The reconstructed MRCP source covered a region with an approximate area of 4 $cm^2$ and exhibited a current source density (CSD) amplitude of 0.27 nA·m. This MRCP-related CSD amplitude was increased to 0.8 nA·m after the tFUS (UPRF 300 Hz) has been directed to the primary leg motor area. By increasing the UPRF to 3000 Hz while maintaining the sonication duration, the MRCP was further enhanced at both the sensor level and the source level even though the subjects performed consistent foot pedaling motion. With the modulation of increased UPRF, the MRCP source amplitude was further increased to 2 nA·m. Besides the change of MRCP amplitudes, the emerging timing of negative peak was also postponed from 2 ms in Sham US to 17 ms in UPRF 300 Hz condition, and further to 21 ms in the condition of UPRF 3000 Hz. The MRCP source activity from the identified area of 3.4 $cm^2$ confined in the reconstructed source area was extracted. The resulted MRCP source profiles were generated for subsequent analyses. The readiness potential (RP), also known as the Bereitschafts potential, priors at the onset of movement (from −400 to −24 ms in Sham US and UPRF 300 Hz; from −400 to −20 ms in UPRF 3000 Hz) and is involved in the movement preparation. According to the definition, it is more accurate to denote this MRCP component as "late RP" given its neighboring timing to the movement onset. Immediately following this late RP, the motor potential (MP) reflecting the movement execution was reconstructed within a much short time period of 36-38 ms (from −24 to 12 ms in Sham US; from −24 to 14 ms in UPRF 300 Hz; from −20 to 18 ms in UPRF 3000 Hz). Lastly, the MRCP source profile reconstructed the third component, movement-monitoring potential (MMP, from 12 to 178 ms in Sham US; from 14 to 362 ms in UPRF 300 Hz; from 18 to 378 ms in UPRF 3000 Hz), which controlled the movement performance. Based on the timing of pedaling movement and sonication, the administered tFUS was specifically modulating the MMP. In addition to the significant change on MRCP source profile amplitude (MSPA), the negative source peak was also delayed from 12 ms in Sham US condition to 14 ms and 18 ms in UPRF 300 Hz and UPRF 3000 Hz conditions, respectively.

Due to substantial inter-subject differences during the foot pedaling execution, the non-parametric paired test for examining the neuromodulatory effects of tFUS on the MRCP in terms of the MSPA was conducted first. The MSPA is equivalent to the amplitude of MMP as illustrated. When comparing the MSPAs acquired from the Sham US condition (3.13±0.99 nA·m) with those from the UPRF 300 Hz condition (6.84±2.39 nA·m), the MSPA was significantly increased (V-statistic=13, $p<0.01$). Such a change persisted when the data were also compared against the UPRF 3000 Hz condition (15.4±6.89 nA·m, V-statistic=2, $p<0.001$). Both tFUS conditions exhibited significantly higher MSPA than the Sham US did. To further determine the effect of UPRF in modulating the MRCP, a non-parametric ANOVA was performed using Kruskal-Wallis rank sum test. For this test, the Sham US condition can be considered as a type of tFUS condition with UPRF of 0 Hz. As a result, we found that the UPRF did play a significant role (Kruskal-Wallis chi-squared=7.24, $p<0.05$) in changing the MSPA of the human subjects. However, the variance of observations in the condition of UPRF 3000 Hz is observed to be larger than the other two conditions. To further probe into a more specific effect of the UPRF, the non-parametric paired Wilcoxon test was further used. Significantly higher MSPAs (V-statistic=21, $p<0.05$) were observed by dosing the higher UPRF, i.e., 3000 Hz.

In this example, the MRCP induced by the right foot pedaling movement is used as a metric to evaluate the tFUS neuromodulation effect on the human motor cortex. The results demonstrated that tFUS modulates the MRCP in an excitatory way, (i.e., increasing the amplitude of MRCP both at the EEG sensor level and at the source domain). One possible mechanism to explain such an enhancement by the tFUS is that the focused acoustic energy may increase excitability of the targeted brain circuit for a short period. Such a period can be as long as 6 minutes at the human primary motor cortex once the cortical excitability was increased by a diagnostic ultrasound paradigm. This may explain the extensive neuromodulatory effects observed in this study during the pre-stimulus period of the repetitive focused sonication trials every 3-5 seconds, despite that the 500-ms tFUS takes place after the onset of motion signal. This may also imply the tFUS-mediated cortical plasticity of the human brain.

Given the importance of the MRCP in the scientific investigations on healthy human subjects and clinical evaluations on patients diagnosed with functional motor disorders, such as Parkinson's disease and amyotrophic lateral sclerosis (ALS), it would be valuable to have a non-invasive neuroimaging tool, such as ESI, to map and quantify the MRCP source at specific brain circuits with high spatiotemporal resolution, thus informing the non-invasive neuromodulation for guidance and feedback. Personalized functional data like those offered by EEG-based ESI in a natural setting for monitoring the tFUS modulating human brain with high spatiotemporal resolutions is desirable.

In this example, it is demonstrated in humans that low-intensity transcranial focused ultrasound (i.e., $I_{SPPA}$=5.90 W/cm$^2$ before skull) can modulate and enhance the voluntary movement-related cortical activity evidenced through the scalp-EEG based source imaging with improved spatiotemporal specificities. Further, the UPRF plays a positive role in amplifying such a neuromodulatory effect of tFUS.

Collectively, our results on human demonstrate the capability of low-intensity tFUS in increasing the excitability of the targeted motor cortex and thus enhancing the endogenous motor cortical processes. The EEG-based ESI imaging guided tFUS may also lead to important applications in assisting motor rehabilitation and enhancing brain-computer interface based on the MRCP.

Ultrasound transducer array-Despite that the electrophysiological sensing in general and ESI in particular can provide in vivo guidance of tFUS targeting through functional readout as a result of the tFUS brain stimulation, to pursue a spatial precision of ultrasound neuromodulation, a tight ultrasound focus in all three dimensions is highly desirable for certain applications. To this need, a multi-element ultrasound array device, shown in FIGS. 12(a-c) as references 1201, 1205 and 1209 can be developed with different array spatial layout. Individual ultrasound elements 1202, 1206, 1210 and 1215 are controlled independently, thus enabling electronic steering of the focal spot 1203, 1207, 1213 and 1216 until the acoustic focal energy reaches the brain targets of neurological disorder. For an example, 128 small footprint elements 1212 form an ultrasound aperture 1211 of the random ultrasound array. Through physical measurements, the coherent focus 1213 in an axial view and 1217 in a lateral view are presented respectively in FIGS. 12(b-c), and this focus can be precisely steered to neighboring locations, such as 1218 and 1219 without the necessity of mechanically move the transducer aperture. This allows minimum efforts in registering the transducer with the brain, thus improving the spatial precision of ultrasound neuromodulation at pre-identified brain targets. The radial array configuration 1201 and the spiral array configuration 1205 lead to significant pattern of side lobes 1204 and 1208 along the beam path; however, the random ultrasound array 1209 and 1211 generates much suppressed side lobe 1214 to enhance the spatial specificity of neuromodulation.

Figure 13:
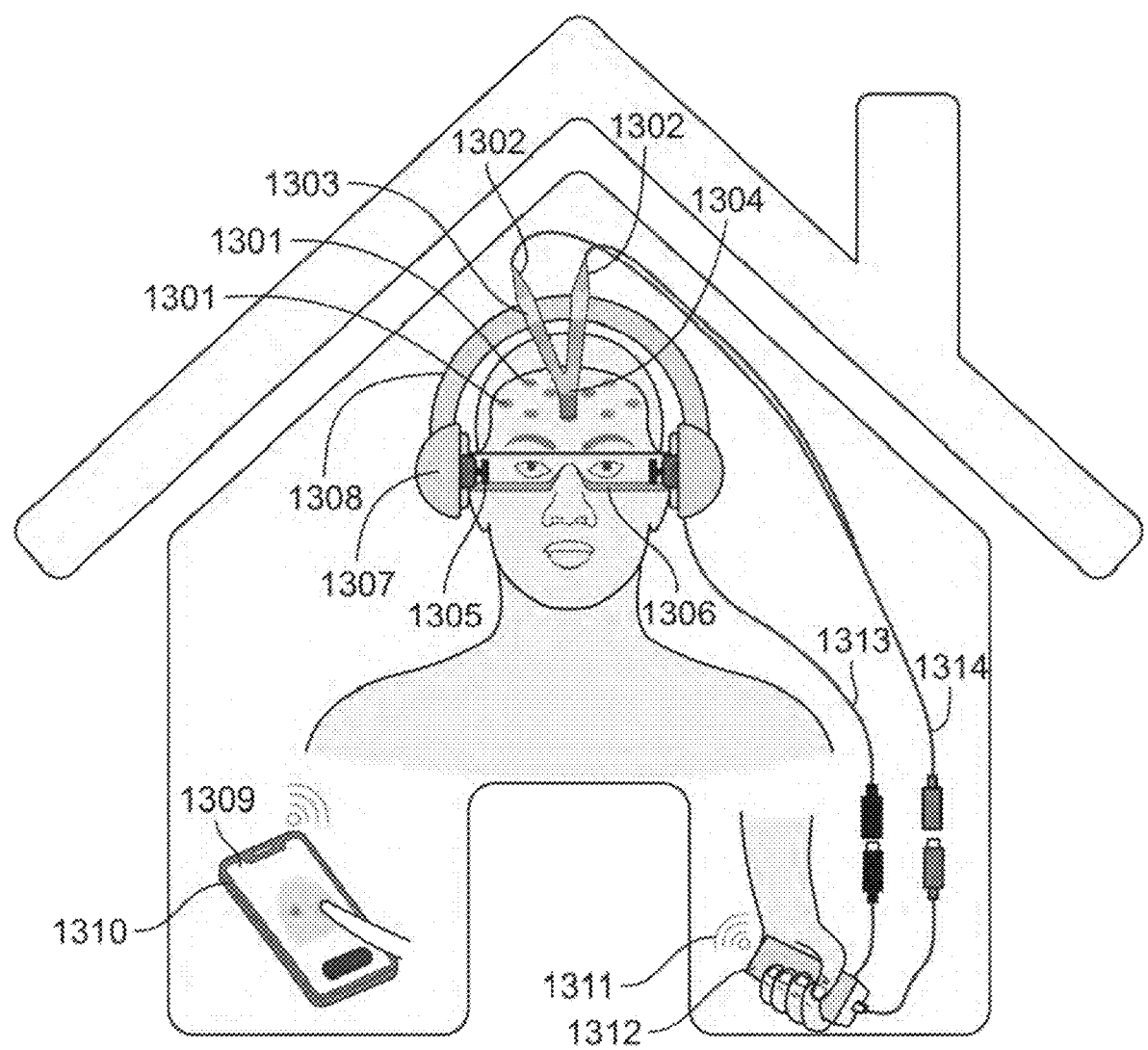
FIG. 13 depicts a method and apparatus of an ESgFUS system used in a home healthcare scenario with a specific tFUS targeting solution.

Point-of-care personalized ultrasound neuromodulation system for home healthcare application—FIG. 13 discloses technical details of point-of-care electrophysiologically guided focused ultrasound (ESgFUS) neuromodulation system, (e.g., home healthcare application), including electrophysiological sensing through a single or a plurality of electrodes 1301 over the scalp and multiple ultrasound transducers 1302 positioned along an arc rail 1308 over the head. This arc rail on a headset-like structure 1307 is positioned and fixed using 3-point regime (i.e., nasion 1306 and two temples 1305 at both sides). The ultrasound beam orientations 1303 of the multiple ultrasound transducers 1302 are adjusted and determined with personalized structural MRI and ultrasound-evoked brain source localization 1304 through the ESI. The EEG sensing signals are acquired through the sensing cable 1313 to the ESgFUS device 1312, and the ESgFUS device 1312 also transmits the ultrasound waveform and temporal sequences to the transducers 1302 through the driving cable 1314. A wireless connection 1311 of the ESgFUS device 1312 communicates with a portable computation device 1310, through which the user/administrator views and configures the brain source location and apply/prescribe neuromodulation dosage on demand. A graphical user interface (GUI) 1309 provides a direct interaction for any customization for the ESgFUS system.

Figure 14A:
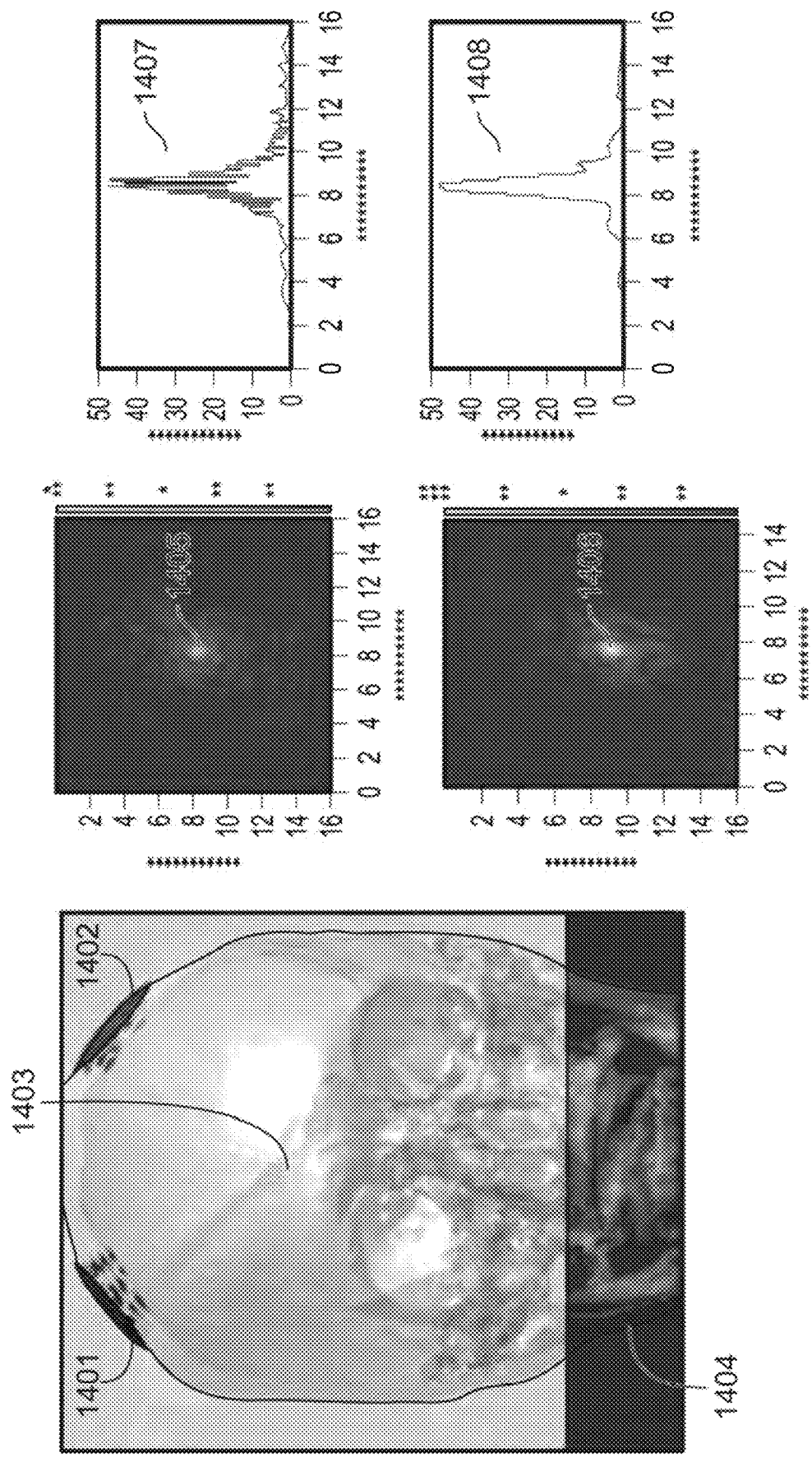
FIGS. 14(a-b) show contralateral and ipsilateral diagrams presenting specific ultrasound spatial profiles to effectively improve the focus and target the deep brain region for neuromodulation rendered by dual single-beam crossing.
Figure 14B:
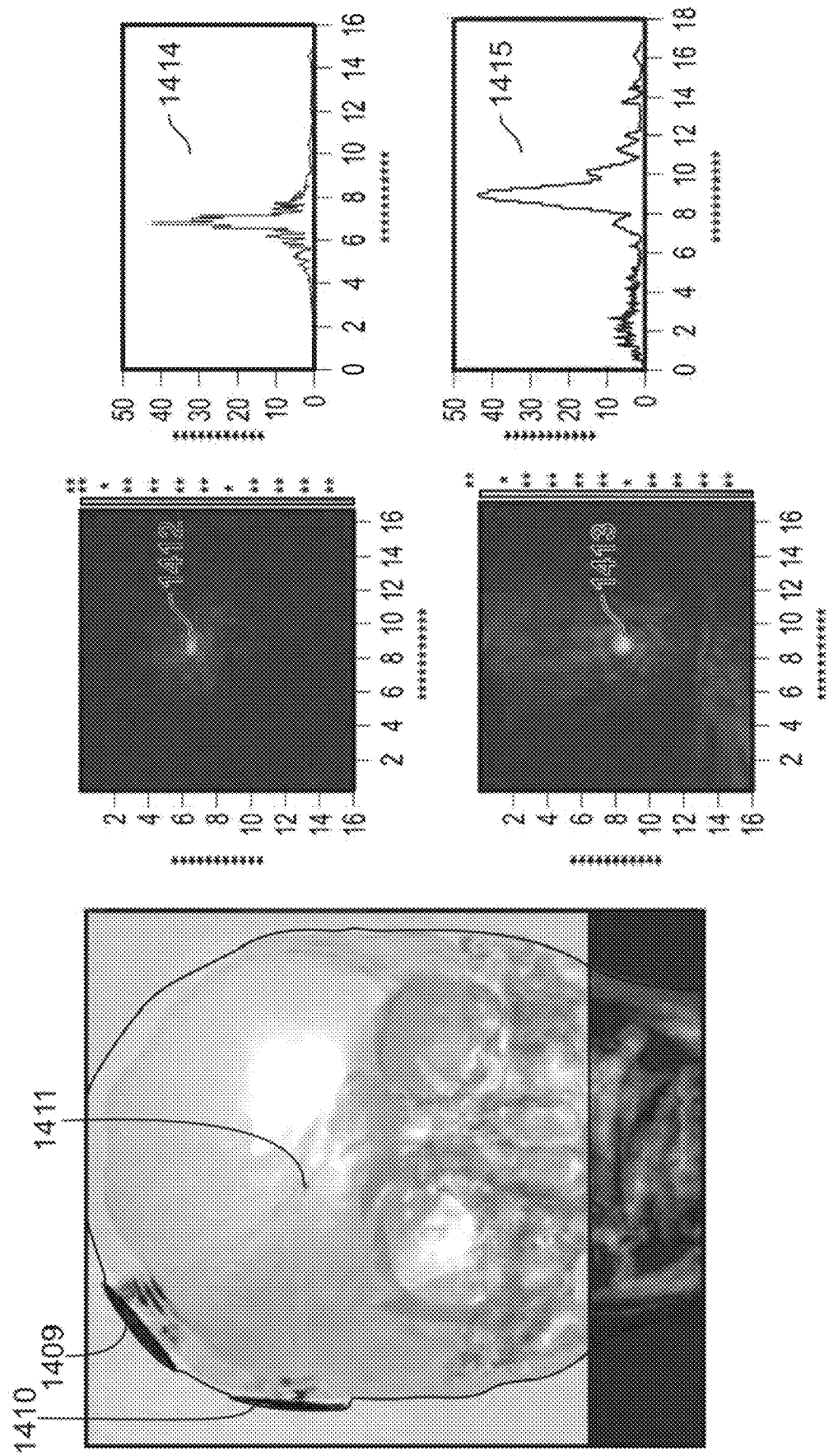

Multiple ultrasound transducers—FIGS. 14(a-b) illustrate an example that the multiple ultrasound transducers can be based on single-element transducers arranged over the scalp targeting at the same location of the brain (i.e., disorder-responsible target), the crossing 1403 and 1411 of the two ultrasound beams transmitted from contralateral single-element transducers 1401 and 1402, or ipsilateral single element transducers 1409 and 1410 leads to an enhanced spatial selectiveness at the deep brain region.

Furthermore, the contralateral transducers' layout yields about 6 mm lateral and 6.5 mm axial focal width (−3 dB contour), and the ipsilateral transducers' layout provides better lateral focal (3.5 mm −3 dB contour width) and 8.5 mm axial focal performances. This design is shown to achieve ultrasound neuromodulation at depth with a higher spatial specificity (e.g., the smaller lateral and axial focal size 1405, 1406, 1412 and 1413), than that using only one single beam, shown in FIG. 3. Such a technique based on single element transducers enables a cost-effective solution that can be used in home healthcare scenarios. More than two single-element transducers can be arranged to pursue such a multi-single-beam crossing scheme to specifically modulate small and deep brain targets involved in the neurological diseases. Notably, the banded patterns in the focus presentations 1405, 1407, 1412 and 1414 are mainly due to the standing waves during the interactions of two ultrasound beams, which reduces the contrast ratio between the main lobe and side lobes, thus decreasing the spatial specificity of ultrasound neuromodulation. The existence of such standing wave pattern depends on the angle of view, and the contrast ratios between the main lobe and side lobes as depicted in lateral views 1405, 1407, 1412 and 1414 are higher than those in axial views 1406, 1408, 1413 and 1415.

Suppressing Standing Waves—The standing waves present in the multiple beam interactions can be further suppressed by ultrasound waveform randomization shown in FIG. 15 (*b*). FIG. 15 (*a*) shows the ultrasound waveform constructions. The fundamental wave 1501 is repeated in a pulsed 1502 or a continuous way, controlled with ultrasound pulse repetition frequency (UPRF) 1503 and the pulse duration (PD) 1504. A number of ultrasound pulses form the sonication duration (SD) 1506 with a controllable intersonication interval (ISI) 1505. To enhance the spatial targeting and thus the neuromodulation effects for treating neurological disorders in the brain, the ultrasound fundamental wave 1501 can be a typical sinusoidal wave 1507 with multiple cycles per pulse 1509, fundamental-frequency-randomized (within the full width at half maximum band of the transducer) wave with alternating mode 1510, phase-keyed wave without alternating mode 1508 or with alternating mode 1511, or fundamental-frequency-randomized phase-keyed wave with alternating mode 1512. Such manipulations of ultrasound waveform create a specific embodiment of the invention that involves reducing the standing wave pattern, especially in the small animal heads when treated by the tFUS, shown in FIG. 16, or in the human heads when multiple tFUS beams interacting with each other, shown in FIG. 14.

FIG. 16 shows computer simulations of tFUS standing wave suppression in a 3D rat skull model 1602 by constructing the randomized waveform 1512 without baseline alternating for a single-element transducer, denoted as "Random Modulated" waveform. The typical sinusoidal wave is denoted with multiple cycles per pulse 1509 as "Standard Raw" waveform. From the results presented in FIG. 16(*b*) and comparing them to FIG. 16(*a*), one can observe that for all three ultrasound fundamental frequencies (i.e., 220 kHz (1601 and 1610), 500 kHz (1606 and 1612) and 750 kHz (1608 and 1614)), the "Random Modulated" waveform is observed to reduce the standing wave pattern of oscillating striped shapes 1604, 1607 and 1609 in the sagittal plane of ultrasound incidence and thus lead to tight focal beams 1611, 1613 and 1615. To quantify the standing wave presence in the "Random Modulated" waveform paradigms, the RFactor and SWR metrics are calculated:

$$RFactor = \frac{P_{max} - P_{min}}{P_{avg}} \quad (3)$$

where the RFactor compares the amplitude of the peak pressure ($P_{max}$) to the valley pressure ($P_{min}$) over a region with an average pressure ($P_{avg}$); and $$SWR = \frac{P_{antinode}}{P_{node}} \quad (4)$$

where SWR is the ratio between the wave antinode pressure ($P_{antinode}$) and the node pressure ($P_{node}$), which quantifies the extent of the wave being a pure or partial standing wave.

It can be observed that for all three fundamental frequencies, both metrics show considerable drops for the "Random Modulated" waveform (R=0.1965±0.0631 and SWR=0.1864±0.0406 dB for 220 kHz ultrasound; R=0.2007±0.0767 and SWR=1.7763±0.6889 dB for 500 kHz ultrasound; R=0.1864±0.0406 and SWR=1.6381±0.3653 dB for 750 kHz ultrasound) compared to the "Standard Raw" waveform modality (R=0.3017±0.1373 and SWR=2.6581±1.2045 dB for 220 kHz ultrasound; R=0.3446±0.1014 and SWR=3.0074±0.8977 dB for 500 kHz ultrasound; R=0.2986±0.0888 and SWR=2.6633±0.8170 dB for 750 kHz ultrasound). Notably, the unwanted hot spot 1605 induced by the 220 kHz "Standard Raw" waveform is eliminated by the "Random Modulated" technique. Therefore, the conclusion can be made that, in the low ultrasound fundamental frequency range, the waveform mode plays a significant role in managing the standing waves formed inside the skull cavity to facilitate the spatial specificity of ultrasound neuromodulation.

Personalized Peripheral Ultrasound Neuromodulation—In one embodiment of the invention, personalized functional data is sensed. The delivery of ultrasound stimulation to peripheral nerves including vagus nerves, occipital nerves, trigeminal nerves, sacral nerves and tibial nerves is based on the personalized functional data. The vagus nerve is related to an individual's overall wellness. The vagus nerve interfaces with the parasympathetic control of the heart, lungs, and digestive tract, plays an important role in regulating the peripheral nervous system, and is able to slow our pulse and lower our blood pressure. The vagus nerve system is a key player in the gut-brain axis, and stimulation of the vagus nerve is found to be able to treat many disorders of neurological origins. Similarly, occipital nerves are found to play an important role in regulating brain function and pain in particular. Trigeminal nerves are found to be able to regulate pain. Sacral nerves and tibial nerves play important roles in regulating and treating overactive bladder symptoms.

Figure 17:
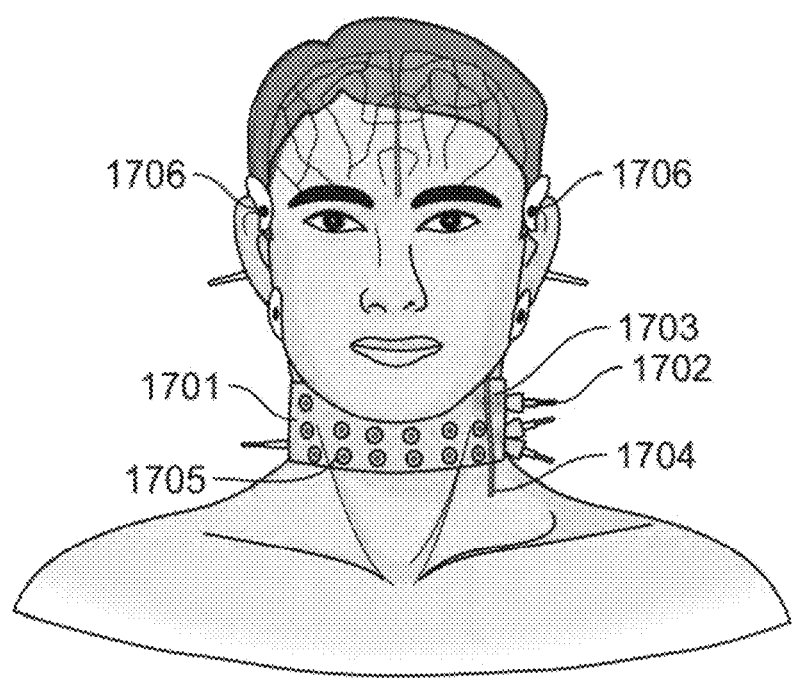
FIG. 17 illustrates vagus nerve ultrasound stimulation on human using single or multiple focused ultrasound beams with personalized electrophysiological sensing.

FIG. 17 illustrates the concept of vagus nerve ultrasound stimulation with focused ultrasound beams 1703 transmitted from transducers or a transducer array 1702 mounted over a neck supporter-like apparatus 1701. The ultrasound energy deposition 1703 is on the vagus nerve 1704, while personalized functional data from the subject are measured using ear EEG electrodes 1706 and/or electrodes 1705 placed on the surface of neck covering the vagus nerve. Ultrasound neuromodulation can be administered through a mounted system onto a neck-supporter-like apparatus 1701, or through using of a handheld ultrasound stimulator. The electrophysiological data collected by the ear EEG 1706 or scalp EEG electrodes can provide general assessment of the response of the nervous system to the vagus nerve stimulation, through which ultrasound stimulation parameters can be adjusted or optimized. The surface electrophysiological data collected by the neck surface electrodes can be used to solve the ESI inverse problem, thus localizing vagus nerve activation, which can be further used to facilitate the targeting/steering of focused ultrasound stimulation onto the vagus nerve.

Figure 18:
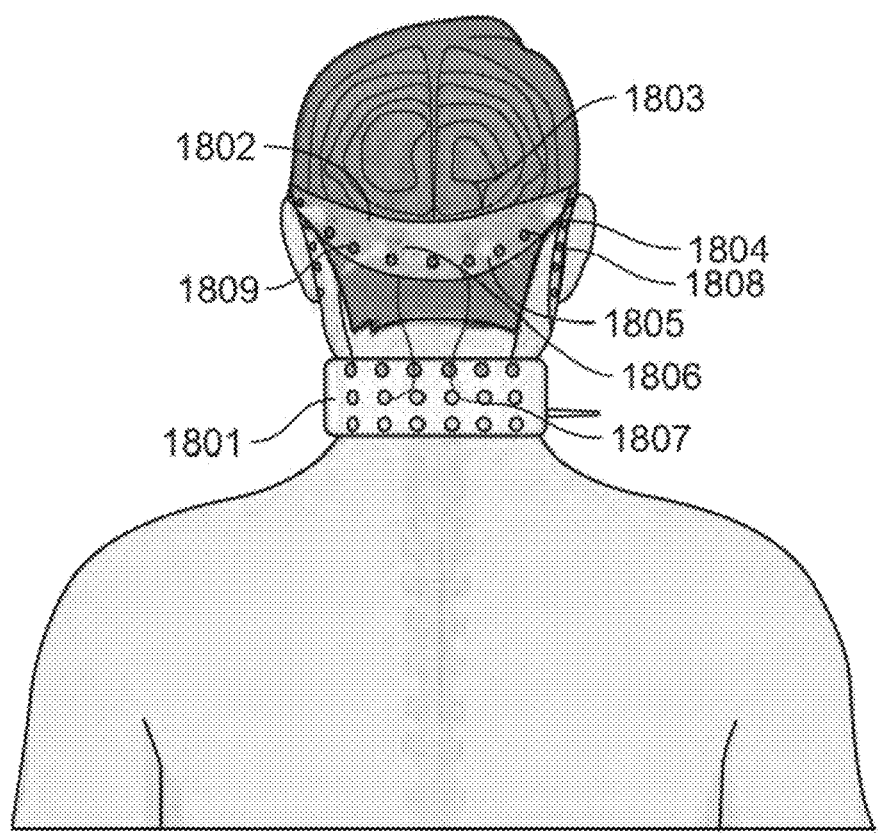
FIG. 18 illustrates occipital nerve ultrasound stimulation with personalized electrophysiological sensing.

FIG. 18 illustrates the concept of occipital nerve ultrasound stimulation with focused ultrasound beams 1806 transmitted from transducers or a transducer array 1805 onto the greater occipital nerves 1803 and/or lesser occipital nerves 1804. The ultrasound transducer(s) is mounted over the occipital area using the headset or helmet-like apparatus 1802, such as using the mechanical structures 306 and 307 in FIG. 3(a). Electrodes over the neck 1807, ear EEG electrodes 1808 or the occipital EEG electrodes 1809 can be used to sense personalized functional data and response to the occipital nervous stimulation. Such personalized electrophysiological data can be used to adjust ultrasound parameters transmitted from the ultrasound transducer(s) 1805 for stimulating the greater occipital nerves 1803 or the transducer(s) for stimulating the lesser occipital nerves 1804.

Figure 19A:
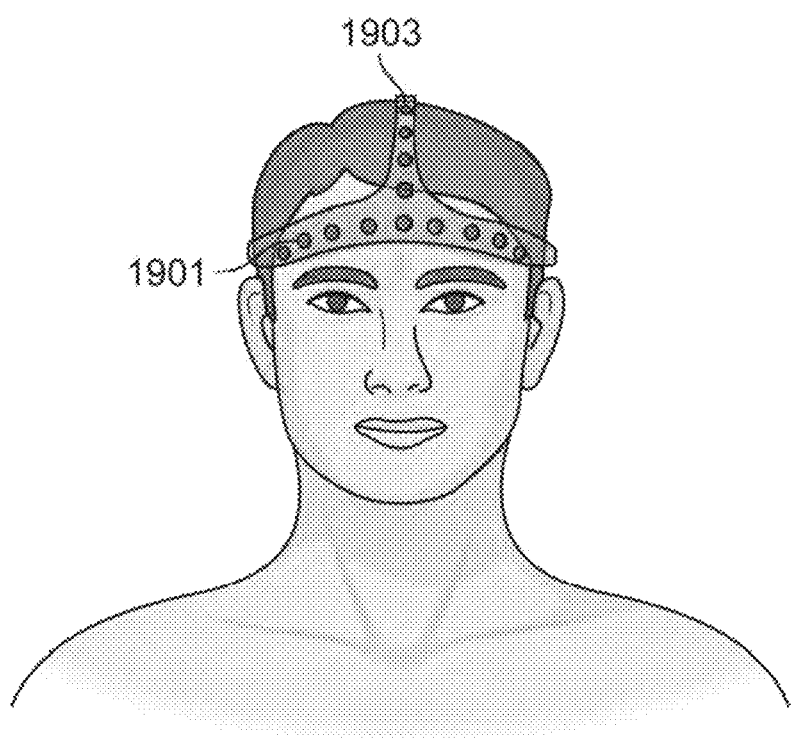
FIGS. 19(a-b) show frontal and occipital lobe and ear EEG recordings.
Figure 19B:
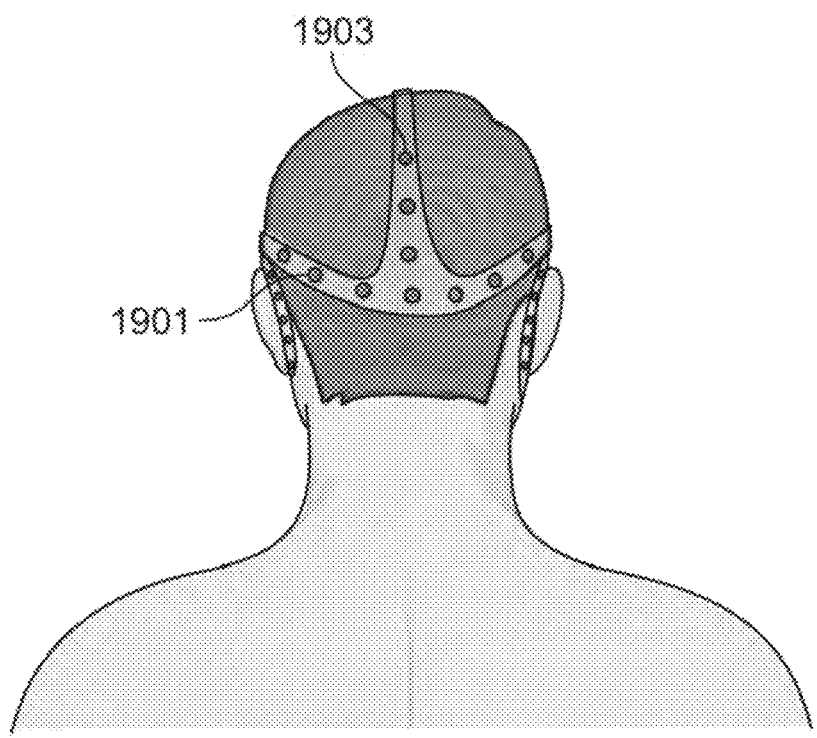

Alternatively, as illustrated in FIGS. 19(a-b), frontal lobe EEG electrodes 1901, occipital lobe EEG electrodes 1902 or medial EEG electrodes 1903, can be used to sense personalized functional data about the brain in response to ultrasound stimulation at vagus nerves, occipital nerves, or trigeminal nerves. Such personalized electrophysiological data can guide ultrasound neuromodulation at vagus nerves to treat cognitive, emotional, neurological and mental conditions, or at occipital nerves or trigeminal nerves for managing pain, or at sacral nerves or tibial nerves to treat overactive bladder symptoms.

Figure 20:
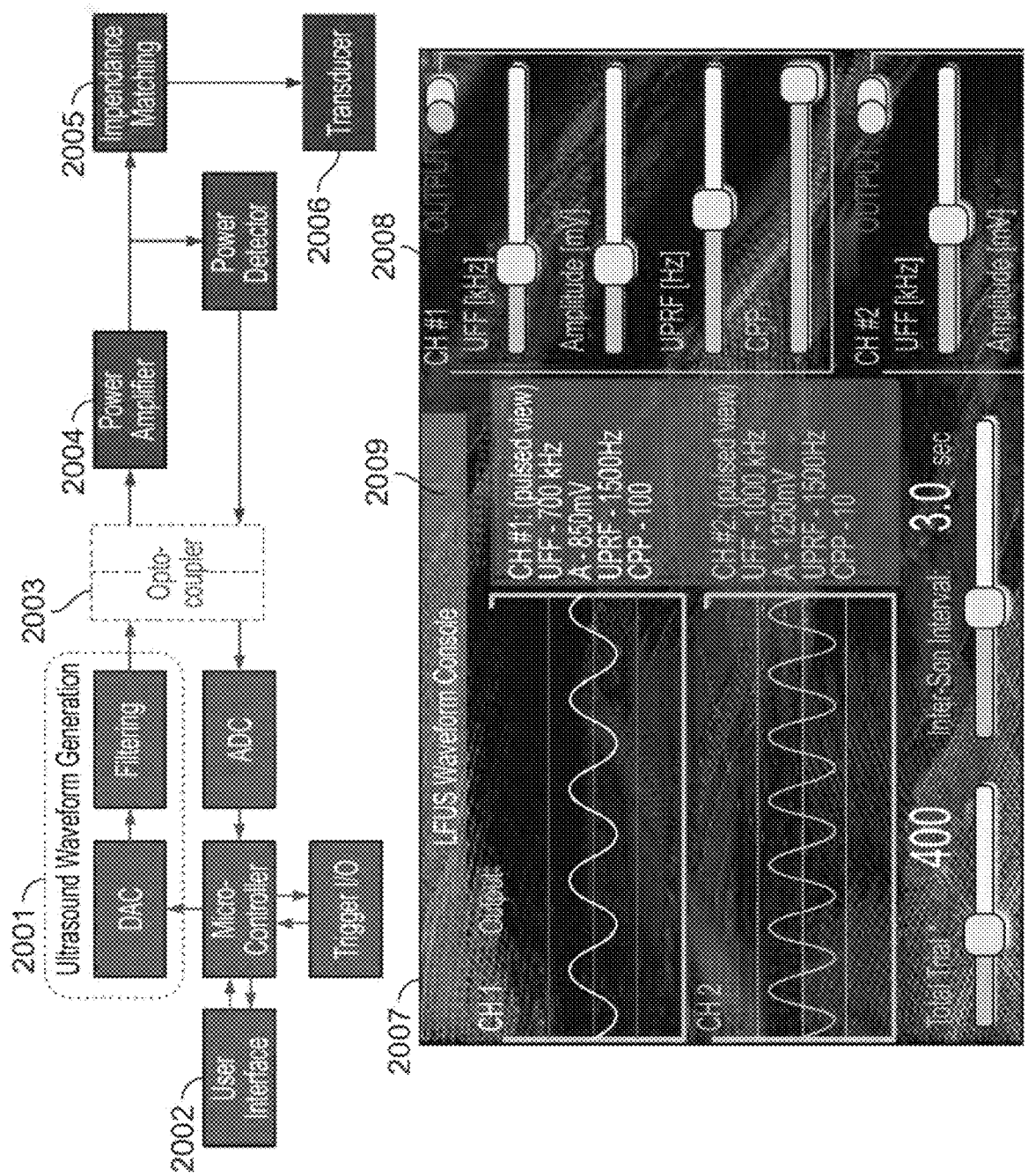
FIG. 20 is a functional diagram of a compact ultrasound console device, including low-energy controlling and sensing circuits, high-power ultrasound driving and power detecting circuits and an example graphic user interface of tFUS waveform console for the ESgFUS device.

Ultrasound console device. Another specific aspect of an embodiment of the invention is the ultrasound console device, shown in FIG. 20. The computer user interface of the console device recognizes the biomarker input and adjust the levels of ultrasound parameters, including the UPRF, PD, duty cycle (DC) and the pressure amplitude, to control the transmitted energy by the ultrasound transducers. This compact console unit, designed in medical-grade scheme for ensuring efficiency and safety, is to effectively drive the ultrasound transducers. As shown in FIG. 20, the device includes the waveform generator 2001 that synthesizes waveforms with amendable parameters online using a high-speed and high-precision digital-to-analog converter, and this module can be preloaded with specific ultrasound parameters for treating specific neurological disease. The power amplifier section 2004 feeds the transducer 2006 through an impedance matching circuit layer 2005. The power detector senses the transmitted and reflected stimulation power for ensuring safety. The opto-coupler 2003 is to provide more safety features in the coupling to the high voltage circuits. The computer and user interfaces 2002 are to customize ultrasound dosage as demanded by the quantified biomarker or the user. All the necessary ultrasound parameters, including the UPRF, UFF, amplitude, and fundamental wave constructions can be set through a touch screen 2007 empowered by a real-time embedded system. This interface can be programmed to inform the user promptly about the ultrasound output.

Figure 21A:
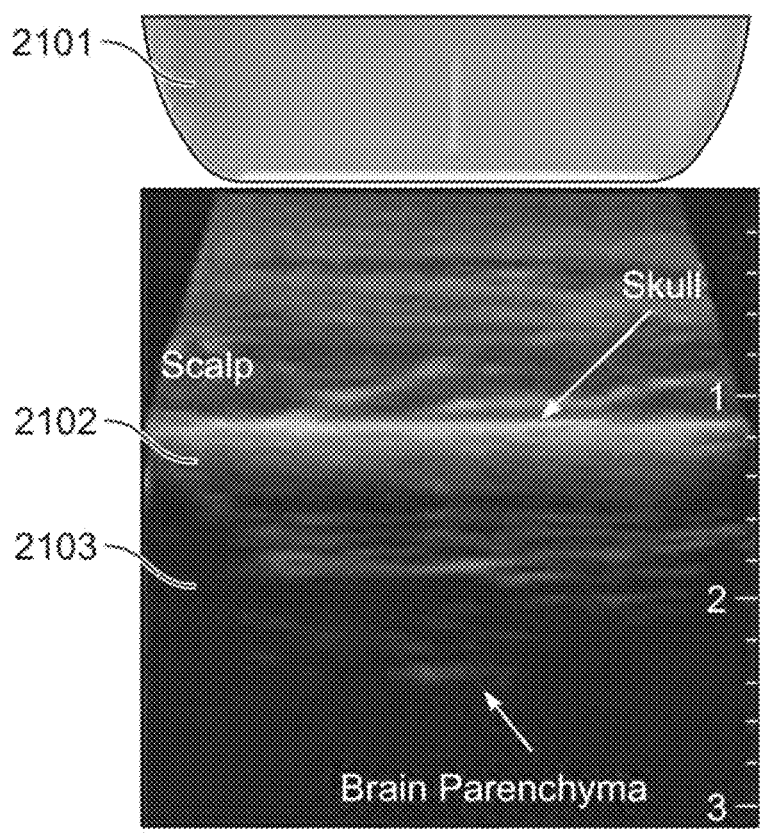
FIGS. 21(a-b) are graphs showing the transcranial focused ultrasound stimulation guided with personalized structural data using transcranial ultrasound imaging and magnetic resonance imaging.
Figure 21B:
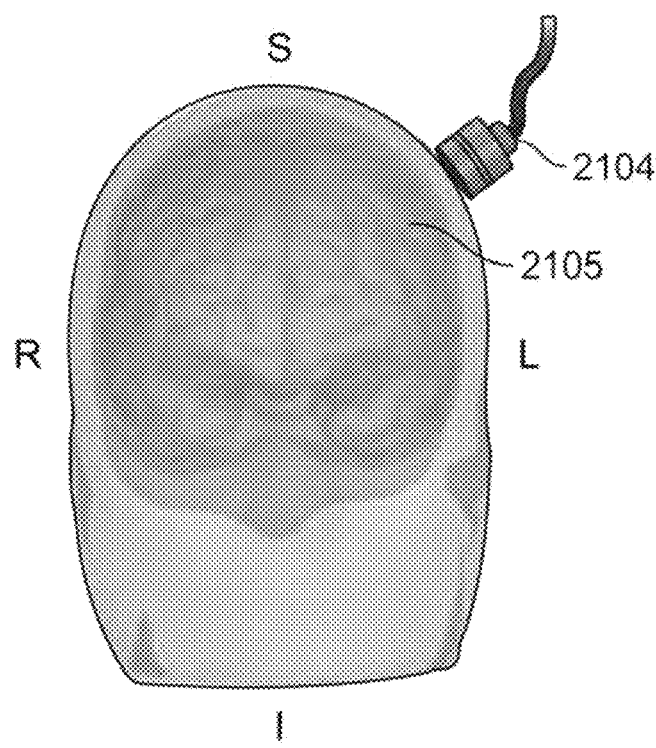

Personalized Structure Imaging Guiding Ultrasound Stimulation—To provide an initial guidance for the tFUS neuromodulation, the personalized transcranial brain structural imaging modalities, such as the transcranial ultrasound imaging and MRI, can be used to guide the transducer placement over the scalp. FIG. 21(a) shows a transcranial ultrasound image indicating the depth of cortical parenchyma 2103. The scalp-skull interface is indicated with a white arrow, and the skull layer 2102 is imaged to inform the adjustment of ultrasound focal spot if one wants to focus the ultrasound energy behind the skull. This is the paradigm of ultrasound-imaging-guided tFUS neuromodulation by integrating an ultrasound imaging probe 2101. As described in the ESgFUS framework, the MRI can provide high resolution whole brain images about the brain structures. From the improved resolution of brain anatomy, one can identify the brain targets 2105 for treatment, to be aligned with the ultrasound focus generated by the transducer 2104 put over the scalp, as shown in FIG. 21(b).

Figure 22:
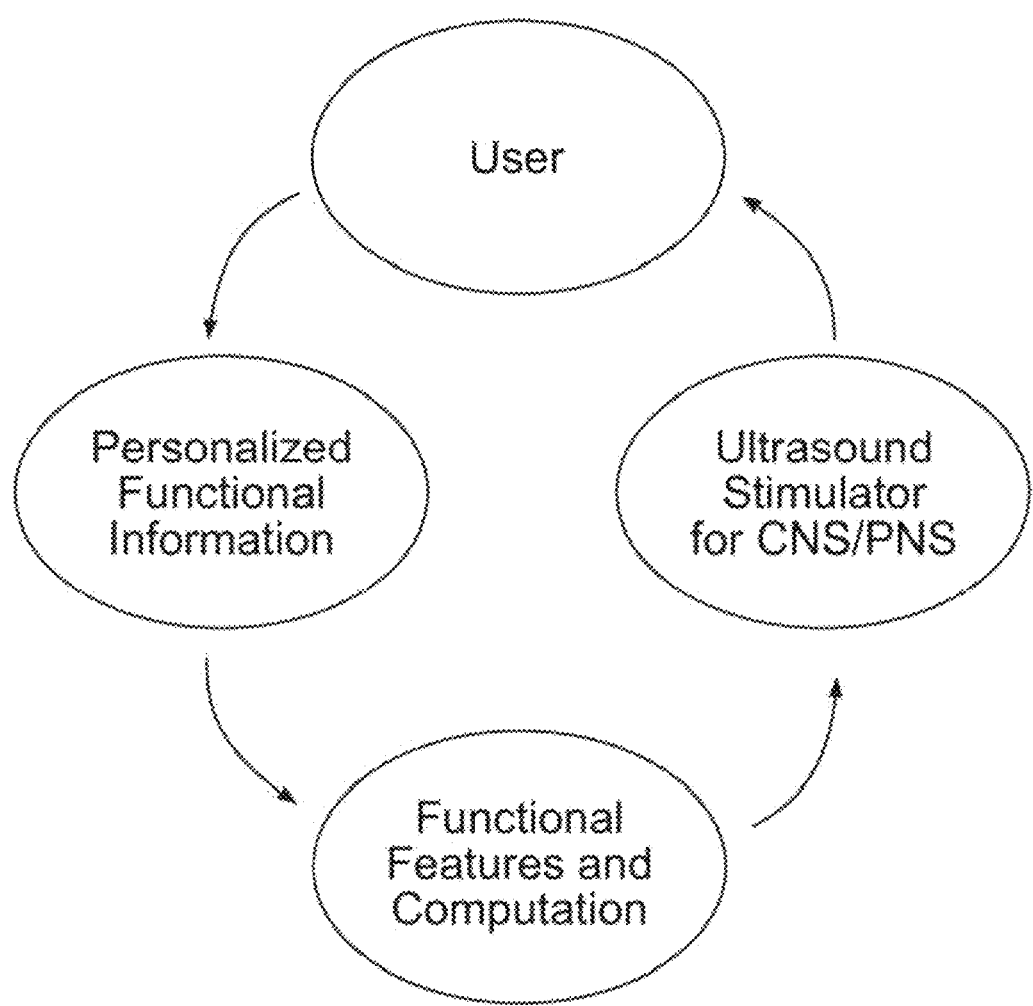
FIG. 22 shows a workflow of a system for personalized ultrasound neuromodulation of the central nervous system (CNS) and peripheral nervous system (PNS).
Figure 23A:
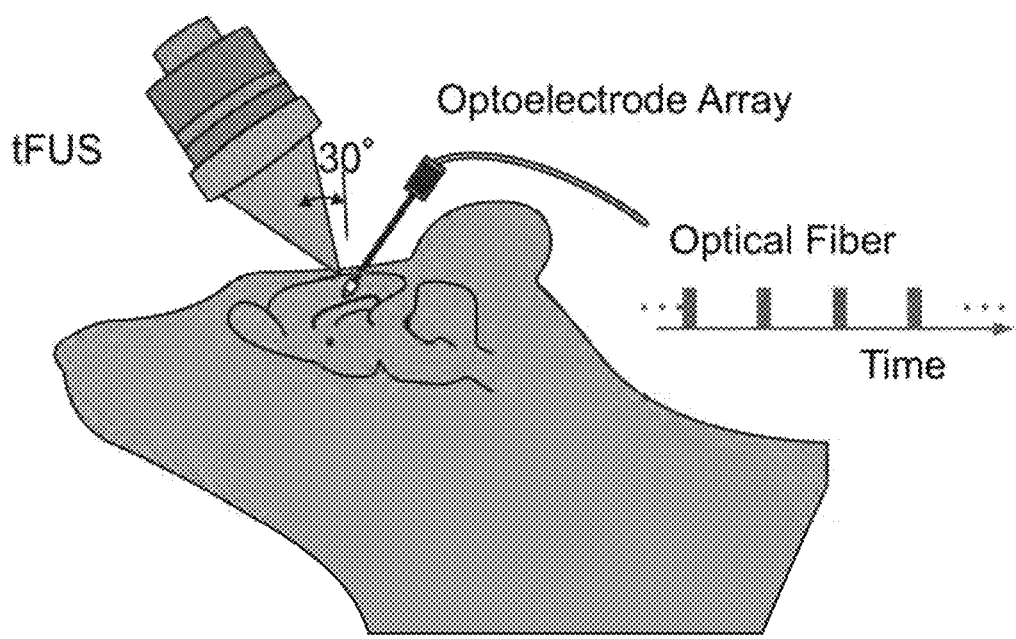
FIGS. 23(a-d) show the capability of tFUS in selectively stimulate cell type specific neuron populations.
Figure 23B:
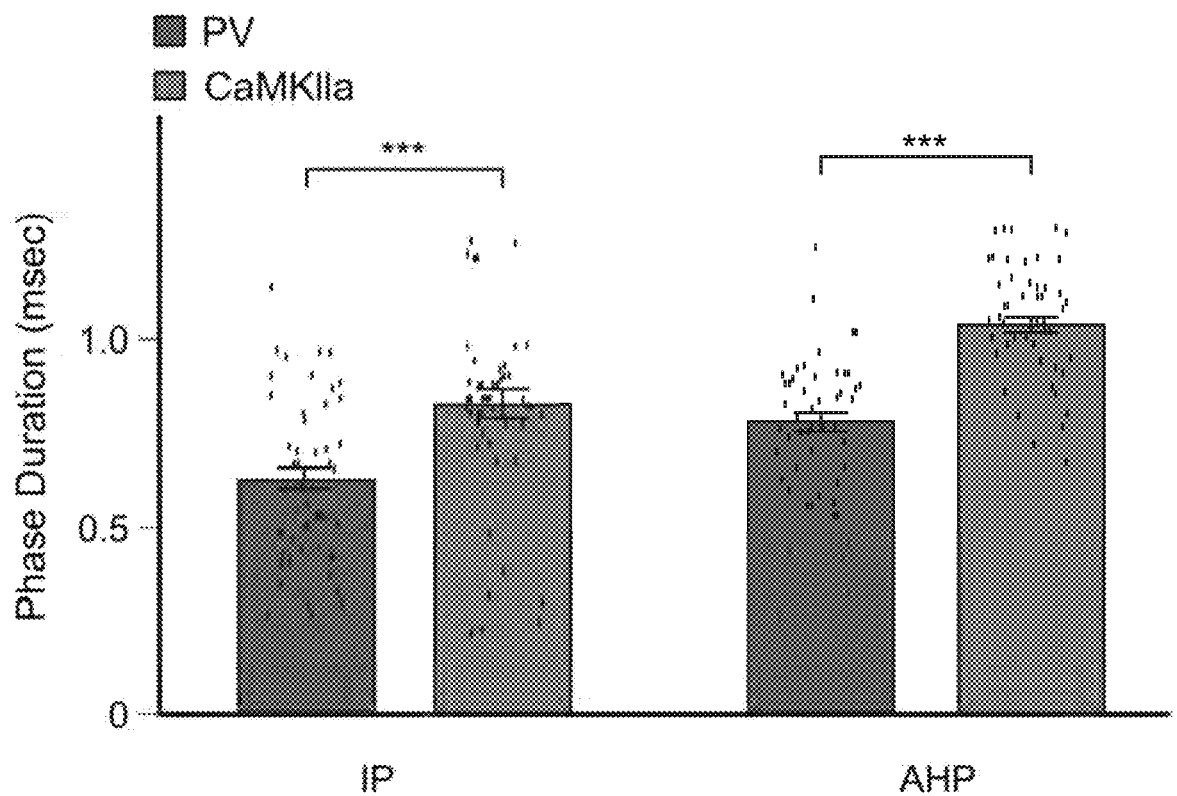
Figure 23C:
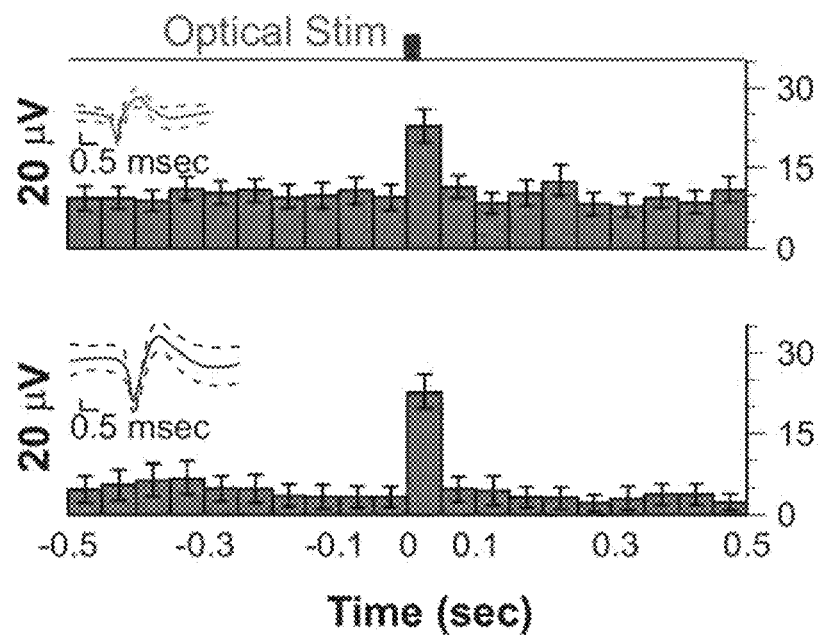
Figure 23D:
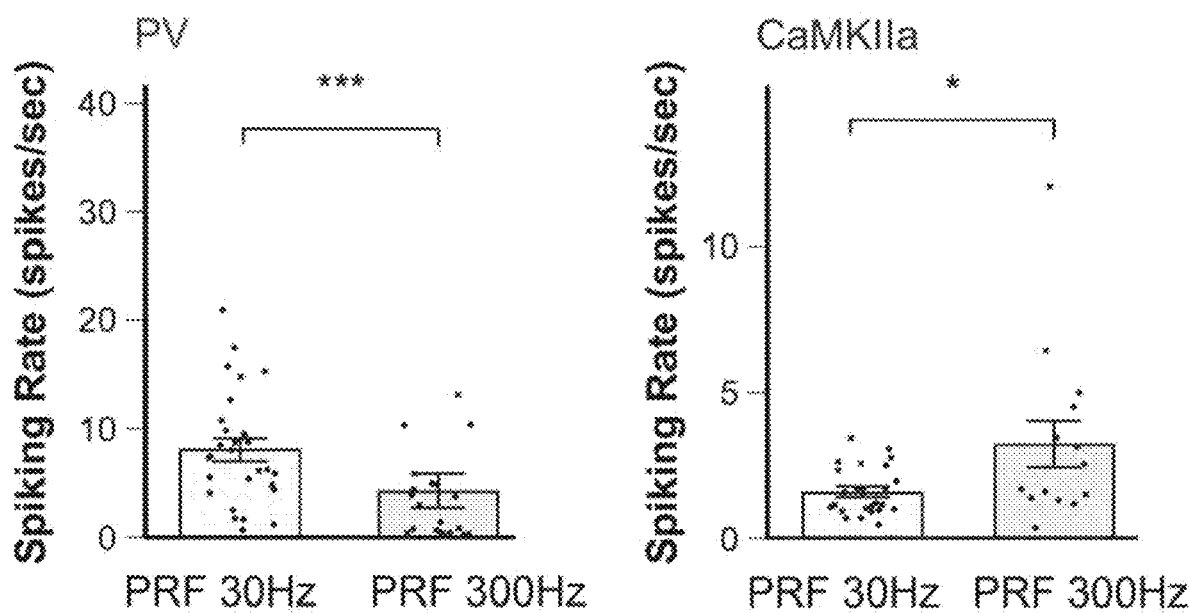

FIG. 22 illustrates a system to practice the invention, wherein an individual subject's personalized functional data is collected, processed through functional feature recognition and computation, and then used to guide ultrasound stimulation including spatial targeting, ultrasound parameters setting and adjustment to achieve optimal dosage. The effect of ultrasound neuromodulation is further assessed by measuring functional data from the individual subject, and the said personalized functional data is further processed and used to guide/adjust ultrasound stimulation to accomplish closed-loop personalized ultrasound neuromodulation. A number of variants can be implemented to practice the invention with various neural sensing and ultrasound stimulation procedures disclosed above, to modulate the central nervous system or peripheral nervous systems.

FIGS. 23(a-d) show the capability of tFUS to selectively stimulate cell-type specific neuron populations. The personalized ultrasound neuromodulation is also based upon the intrinsic functional excitatory/inhibitory neuronal specificity of transcranial focused ultrasound. FIG. 23(a) demonstrates the capability of tFUS on stimulating specific neuron types in transgenic mouse models with parvalbumin (PV) and CaMKII-alpha cortical neurons identified by response to optical stimulation. As shown, a specific 3D-printed collimator is used to guide tFUS to the hair-removed scalp of a transgenic mouse model with the indicated incidence angle. A 32-channel opto-electrode array inserted at another incidence angle into the left somatosensory cortex S1 prepared through a craniotomy. Blue light stimuli were pulsed using a PlexBright LD-1 Single-Channel LED driver at 30 mA and were then delivered via optical fiber to the recoding side of the shank. As shown in FIG. 23(b), the peri-stimulus time histograms (PSTHs) of one PV spiking unit (upper, 258 trials for each time bin, IP duration mean: 550 µs; AHP duration mean: 850 µs) and one CaMKIIa spiking unit (lower, 128 trials for each time bin, IP duration mean: 600 µs; AHP duration mean: 1100 µs) responding to the optical stimuli. Spike waveforms depicted as insets, with solid red line as the mean waveform, dashed lines as the waveform standard deviation. Data are shown in the PSTHs as the mean±95% confidence interval. Further, as illustrated in FIG. 23(c), comparing PV (n=53) and CaMKIIa (n=50) neurons regarding the IP (PV vs. CaMKIIa: $p=6\times10^{-5}$) and AHP (PV vs. CaMKIIa: $p=3\times10^{-12}$) phase durations. Data are shown as the mean±s.e.m., statistics by one-tail Wilcoxon test. \*\*\*p<0.001. FIG. 23(d) present the comparisons of spiking rates between the tFUS conditions of PRF 30 Hz (n=28 for PV neurons, n=27 for CaMKIIa neurons) and PRF 300 Hz (n=25 for PV neurons, n=15 for CaMKIIa neurons) on PV (D) (PRF 30 Hz vs. PRF 300 Hz: $p=2\times10^{-4}$) and CaMKIIa (E) (PRF 30 Hz vs. PRF 300 Hz: p=0.016) neurons, respectively. Data are shown as the mean±s.e.m., statistics by two-tail Wilcoxon test. *p<0.05, ***p<0.001.

Figure 24A:
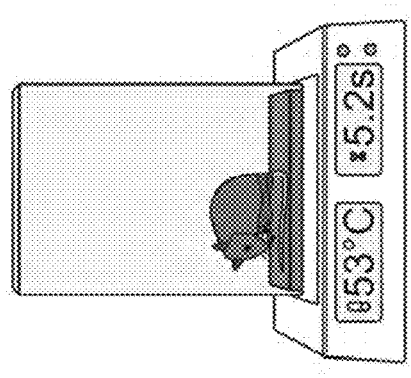
FIGS. 24(a-b) show the effect of tFUS on managing pain sensitivity.
Figure 24B:
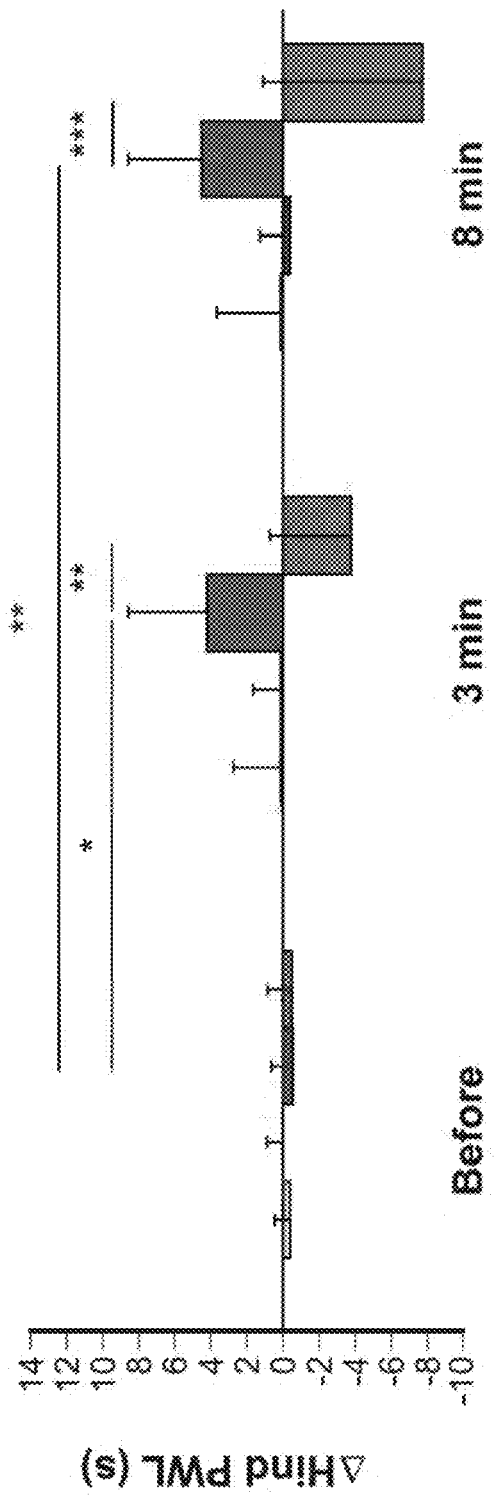
Figure 25B:
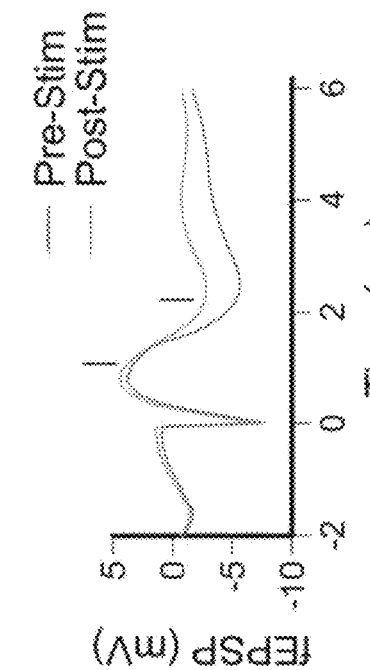
FIGS. 25(a-d) show the long-term effect of ultrasound stimulation.
Figure 25D:
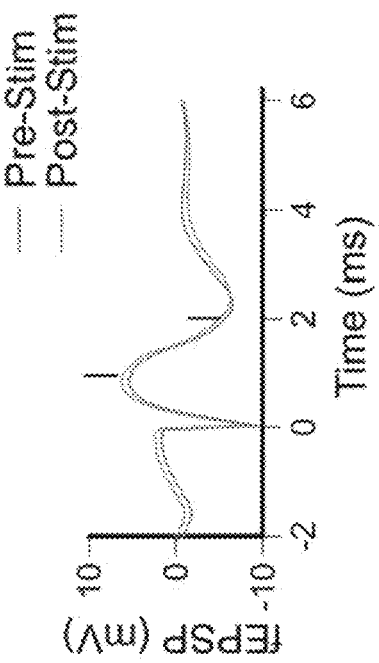
Figure 25A:
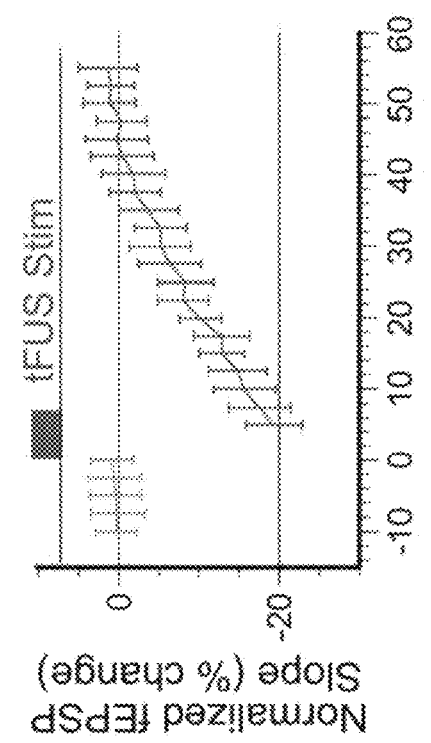
Figure 25C:
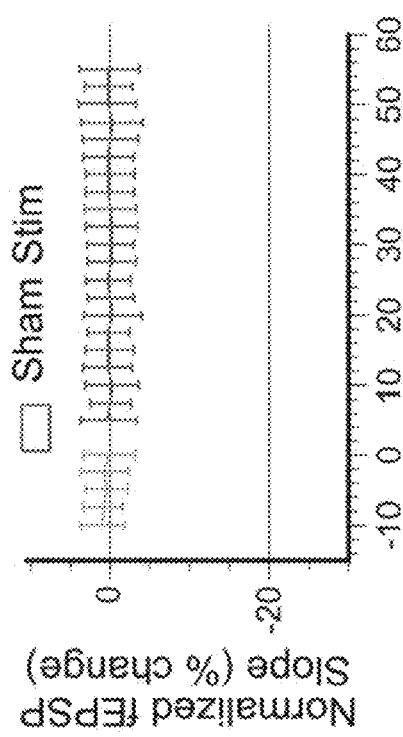

FIGS. 24(a-b) show the effect of tFUS on manage pain sensitivity. As shown in FIG. 24(a), the pain sensitivity is assessed using an established thermal-induced Δ hind paw withdrawal latency (PWL) assessment protocol. The figure shows blind test results on Δ hind paw withdrawal latency (PWL) among a negative control, sham, and experimental groups before and after tFUS stimulation at the left hindlimb of the primary somatosensory cortex (S1HL). In the sham group, tFUS was directed to a control brain location; and the negative control group followed the same experimental procedures without tFUS stimulation. The averaged Δhind PWL treated with sham group or obtained from a negative control group was not significantly different from baseline values. However, the averaged Δ hind PWL by tFUS stimulation with a lower pulse repetition frequency (PRF, 40 Hz) at the left S1HL was significantly increased compared to the values before tFUS stimulation. Negative values of the averaged Δ hind PWL were also found when tFUS stimulation with higher PRF (3000 kHz) was applied, which shows that tFUS stimulation can exacerbate thermal hypersensitivity in the SCD mice. As shown in FIG. 24(b), based on the experimental results, tFUS at left S1HL can modulate (suppress or accelerate) thermal pain perception in female HbSS mice as a function of PRF values. Statistics were implemented by Friedman test and Kruskal-Wallis test; *p<0.05, p<0.01, *p<0.001. This result illustrates that by personalized tFUS stimulation (with the parameters optimized based upon an individual and specific condition) desirable intervention can be achieved.

FIGS. 25(a-d) illustrate the long-term effects of hippocampus ultrasound stimulation. Baseline fEPSP slopes are shown in yellow, post-tFUS fEPSP slopes are shown in red. The red block denotes the timing of administering tFUS for 5 min, applied from Time zero. Data shown in FIGS. 25(a, c) as mean±std. across 3-min time windows. FIG. 25(b) shows the average fEPSP waveforms pre- and post-tFUS stimulation. The "pre-stim" line represents the fEPSP before the stimulation, and the "post-stim" indicates the one after the stimulation. Markers show segments used to measure fEPSP slope. In FIG. 24(c), the sham tFUS at 3 kHz PRF was delivered by applying ultrasound to a control location at an anterior contralateral cortex, which controls for vibrations of tFUS coupled across the skull without tFUS application at hippocampus. All other procedures held constant. FIG. 25(d), the average fEPSP waveforms pre- and post-sham tFUS stimulation at a control location in the anterior contralateral cortex are shown. The "pre-stim" line represents the fEPSP before the stimulation, and the "post-stim" line indicates the one after the stimulation. Markers show segments used to measure fEPSP slope. This figure shows properly controlled tFUS stimulation can have long-term effect on brain function, after termination of delivering ultrasound. This figure also demonstrates the capability of tFUS stimulation of deep brain structure.

As would be realized by one of skill in the art, the disclosed systems and methods described herein can be implemented by a system comprising a processor and memory, storing software that, when executed by the processor, performs the functions comprising the method. For example, the training, testing and deployment of the model can be implemented by software executing on a processor.

As would further be realized by one of skill in the art, many variations on implementations discussed herein which fall within the scope of the invention are possible. Specifically, many variations of the parameters, the components used, and their arrangement could be used to obtain similar results. The invention is not meant to be limited to the particular exemplary model disclosed herein. Moreover, it is to be understood that the features of the various embodiments described herein were not mutually exclusive and can exist in various combinations and permutations, even if such combinations or permutations were not made express herein, without departing from the spirit and scope of the invention. Accordingly, the method and apparatus disclosed herein are not to be taken as limitations on the invention but as an illustration thereof. The scope of the invention is defined by the claims (and their equivalents) which follow.

The invention claimed is:

1. A method for non-invasive personalized neuromodulation:
sensing personalized data about the biological system;
determining baseline parameters of ultrasound stimulation based on collected personalized data;
delivering the ultrasound stimulation using the baseline parameters to one or more specific targets through a surface of the biological system using a plurality of ultrasonic elements spatially distributed over the surface of the biological system, each of the plurality of ultrasonic elements location being registered in reference to specific anatomical locations of the one or more specific targets;
estimating neural activity using an electrophysical source imaging process in which the neural activity is estimated based on a spatio-temporal distribution of electrophysiological signals on the surface of the biological system;
processing the estimated neural activity to adjust the parameters of the ultrasound stimulation;
processing the estimated neural activity to adjust spatial targeting of the ultrasound stimulation to the one or more specific targets, the spatial targeting accomplished by converting a spatial position of each ultrasound element to a subject-specific time-delay profile of the ultrasound array distributed over the surface of the biological system; and
delivering the ultrasound stimulation using the adjusted parameters and spatial targeting over a duration.

2. The method of claim 1 wherein delivering the ultrasound stimulation modulates a nervous system of the biological system.

3. The method of claim 1 wherein the sensing of personalized data comprises non-invasive sensing of personalized functional data.

4. The method of claim 3 wherein the non-invasive sensing of personalized data comprises sensing electrophysiological signals of the biological system using one or more recording sensors.

5. The method of claim 1 wherein the ultrasound stimulation comprises low-intensity focused ultrasound concentrated onto one or more targets within the biological system.

6. The method of claim 1, wherein the sensing of personalized data comprises sensing electrophysiological signals of the biological system using one or more recording sensors.

7. The method of claim 5, wherein the biological system is a brain.

8. The method of claim 7:
wherein the low-intensity focused ultrasound is delivered transcranially to one or more targets in the brain;
wherein the neural activity is ultrasound-induced electrical activity; and
wherein estimating the neural activity using the electrophysiological source imaging process comprises sensing electrophysiological signals of the brain induced by the ultrasound stimulation.

9. The method of claim 7:
wherein the low-intensity focused ultrasound is delivered transcranially to one or more targets in the brain;
wherein the neural activity is ultrasound-induced electrical activity;
wherein estimating the neural activity using the electrophysiological source imaging process comprises sensing and imaging source distributions of the ultrasound-induced electrical activity;
wherein the source distributions guide personalized targeting of the transcranial focused ultrasound to brain regions using the source distribution; and
wherein the ultrasound stimulation parameters are adjusted based on the ultrasound-induced electrical activity.

10. The method of claim 7 wherein structural data of the brain is used in addition to the personalized data to target the ultrasound stimulation.

11. The method of claim 1 wherein the parameters consist of temporal sequence, intensity, and waveform construction of the low-intensity focused ultrasound.

12. The method of claim 5, wherein the ultrasound stimulation is applied to a vagus nerve.

13. The method of claim 12:
wherein the low-intensity focused ultrasound is delivered to the vagus nerve on the neck;
wherein the neural activity is ultrasound-induced electrical activity; and
wherein delivering the ultrasound stimulation comprises targeting and adjusting the low-intensity focused ultrasound to the vagus nerve.

14. The method of claim 5, wherein ultrasound is applied to modulate occipital nerves.

15. The method of claim 14:
wherein the low-intensity focused ultrasound is delivered to the occipital nerve;
wherein the neural activity is ultrasound-induced electrical activity; and
wherein delivering the ultrasound stimulation comprises targeting and adjusting the low-intensity focused ultrasound stimulation to the occipital nerve.

16. The method of claim 5, wherein ultrasound is applied to modulate trigeminal nerves.

17. The method of claim 16:
wherein the low-intensity focused ultrasound is delivered at the trigeminal nerve;
wherein the neural activity is ultrasound-induced electrical activity; and
wherein delivering the ultrasound stimulation comprises targeting and adjusting the focused ultrasound stimulation to the trigeminal nerve.

18. The method of claim 1, wherein the ultrasound stimulation comprises transmitting low-intensity focused ultrasound from one or more ultrasound elements mounted over a rigid or flexible substrate to concentrate ultrasound energy onto one or more targets within the biological system.

19. The method of claim 1, wherein the ultrasound stimulation comprises tone-burst sinusoidal waves, randomized waves or alternating waves.

20. The method of claim 19 wherein the ultrasound stimulation has an ultrasound pulse repetition frequency between 0.01 and 10000 Hz to induce inhibitory/excitatory effects at certain neural targets.

21. The method of claim 20 wherein the randomized waves consist of cycles of sinusoidal component with an initial randomized phase ranging from 0 to $2\pi$, a randomized ultrasound fundamental frequency in a range of 50-3000 kHz and a sonication burst duration in a range of 0.1-100000 microseconds with randomized baseline alternation.

22. The method of claim 1, wherein the ultrasound stimulation comprises a plurality of crossing transcranial focused ultrasound beams transmitted in a waveform pattern and orientation to minimize interference.

23. The method of claim 22 wherein minimizing interference enhances a contrast ratio between a main ultrasound focus and one or more side lobes, reduces a standing wave pattern and increases spatial specificity of the ultrasound targeting.

24. The method of claim 22, further comprising:
enhancing focus of the transcranial focused ultrasound onto the brain targets using multi-single-beam crossing in large brain models or a multi-element transducer array.

25. The method of claim 1, wherein the electrophysiological source imaging is facilitated by other medical imaging techniques including magnetic resonance imaging of the brain of subject, computer tomography of the skull of subject, and optical imaging of the subject's head and ultrasound transducers.

26. The method of claim 1 wherein electrophysiological source imaging based on scalp EEG or MEG recordings is used to determine the one or more targets and parameters of the ultrasound stimulation based on personalized altered brain response, including ultrasound pulse repetition frequency, ultrasound intensity and ultrasound duty cycle.

27. The method of claim 1:
wherein the biological system is a human subject;
wherein the personalized data of the subject are used to locate a tumor within the body of the subject; and
wherein the ultrasound stimulation is targeted to treat the tumor and/or to manage pain caused by the tumor.

28. The method of claim 1 wherein the electrophysical source imaging process comprises solving a personalized optimization which includes regularization terms capturing spatial and temporal priors.

29. The method of claim 1 wherein electrophysical source imaging process counters the effects of volume conduction or field propagation for reconstructing neural sources induced by ultrasound neuromodulation from the electrophysiological measurements over the surface of the biological system.

* * * * *